US009973119B2

(12) United States Patent
Leman et al.

(10) Patent No.: US 9,973,119 B2
(45) Date of Patent: May 15, 2018

(54) SINGLE PHASE MOTOR DRIVE CIRCUIT AND A METHOD OF DRIVING A SINGLE PHASE MOTOR

(71) Applicant: Melexis Technologies NV, Tessenderlo (BE)

(72) Inventors: Dirk Leman, Lier (BE); Huowen Zhang, Shanghai (CN); Xing Zuo, ShenZhen (CN)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 0 days. days.

(21) Appl. No.: 15/019,032

(22) Filed: Feb. 9, 2016

(65) Prior Publication Data
US 2016/0241172 A1   Aug. 18, 2016

(30) Foreign Application Priority Data

Feb. 18, 2015   (GB) .................................. 1502695.8

(51) Int. Cl.
*H03K 5/00*   (2006.01)
*H02P 6/08*   (2016.01)
*H02P 25/04*   (2006.01)
*H02P 6/26*   (2016.01)
*H02P 6/16*   (2016.01)
*H02P 6/10*   (2006.01)

(52) U.S. Cl.
CPC .................. *H02P 6/08* (2013.01); *H02P 6/16* (2013.01); *H02P 6/26* (2016.02); *H02P 25/04* (2013.01); *H02P 6/10* (2013.01)

(58) Field of Classification Search
CPC .................. H02P 6/08; H02P 6/26; H02P 6/16

USPC ...................................................... 318/400.13
See application file for complete search history.

(56) References Cited

U.S. PATENT DOCUMENTS

2001/0048278 A1   12/2001   Young et al.
2002/0060544 A1   5/2002   Teutsch et al.
(Continued)

FOREIGN PATENT DOCUMENTS

EP   2077611 A2   7/2009
JP   2009296839 A   12/2009

OTHER PUBLICATIONS

Great Britain Search Report from corresponding GB Application No. GB1502695.8, Sep. 4, 2015.
(Continued)

*Primary Examiner* — Erick Glass
(74) *Attorney, Agent, or Firm* — Workman Nydegger

(57) ABSTRACT

A single phase motor drive circuit for driving a single phase motor, comprising: a timer unit for receiving a sensor signal indicative of an angular position of a rotor, and for providing a timing signal in phase with the sensor signal; a waveform generator for generating a waveform for energizing the motor, the waveform generator being adapted for receiving the timing signal and a configurable setting, and for generating the waveform based thereon; a configuration unit for receiving an input signal indicative of a desired motor speed, the configuration unit being adapted for generating the configurable setting as a function of the input signal, and for providing the setting to the waveform generator to dynamically configure the waveform generator. A method, an assembly and a cooling system includes the single phase motor driver circuit.

16 Claims, 15 Drawing Sheets

(56) References Cited

U.S. PATENT DOCUMENTS

| | | | | |
|---|---|---|---|---|
| 2010/0181951 A1* | 7/2010 | Noie | ................... | H02P 6/20 |
| | | | | 318/400.11 |
| 2011/0181214 A1 | 7/2011 | Nakahata et al. | | |
| 2011/0279072 A1* | 11/2011 | Shimizu | ................... | H02P 6/16 |
| | | | | 318/400.04 |
| 2013/0175957 A1* | 7/2013 | Ishikawa | ................... | H02P 6/06 |
| | | | | 318/400.23 |
| 2014/0062355 A1* | 3/2014 | Wang | ................... | H02P 6/14 |
| | | | | 318/400.04 |
| 2015/0061551 A1* | 3/2015 | Tsai | ................... | H02P 25/04 |
| | | | | 318/400.2 |

OTHER PUBLICATIONS

Extended European Search Report corresponding from EP Application No. 16154767.4, Jul. 8, 2016.

* cited by examiner

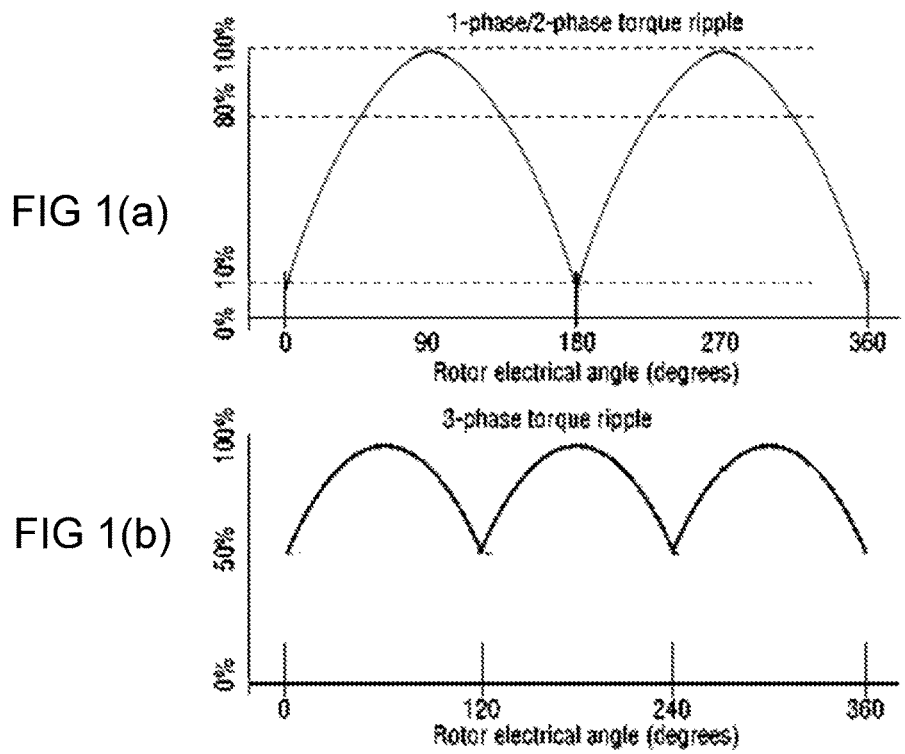
FIG 1(a)
FIG 1(b)
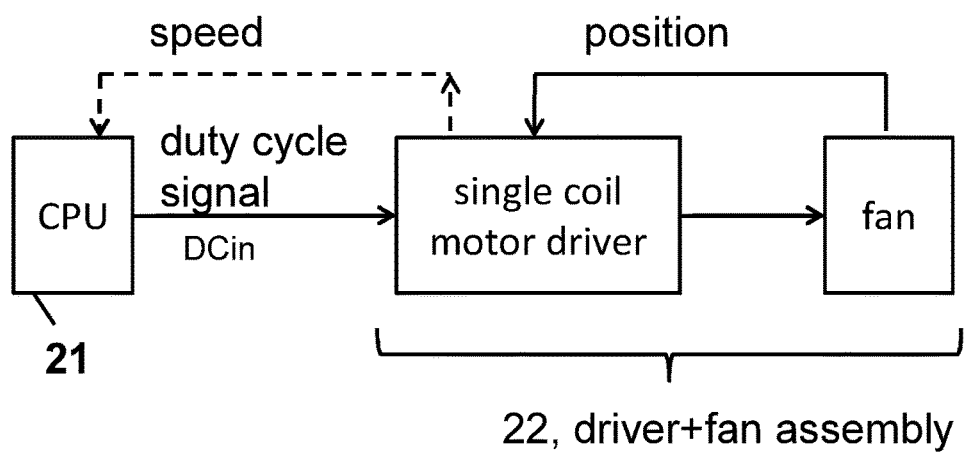
FIG 2

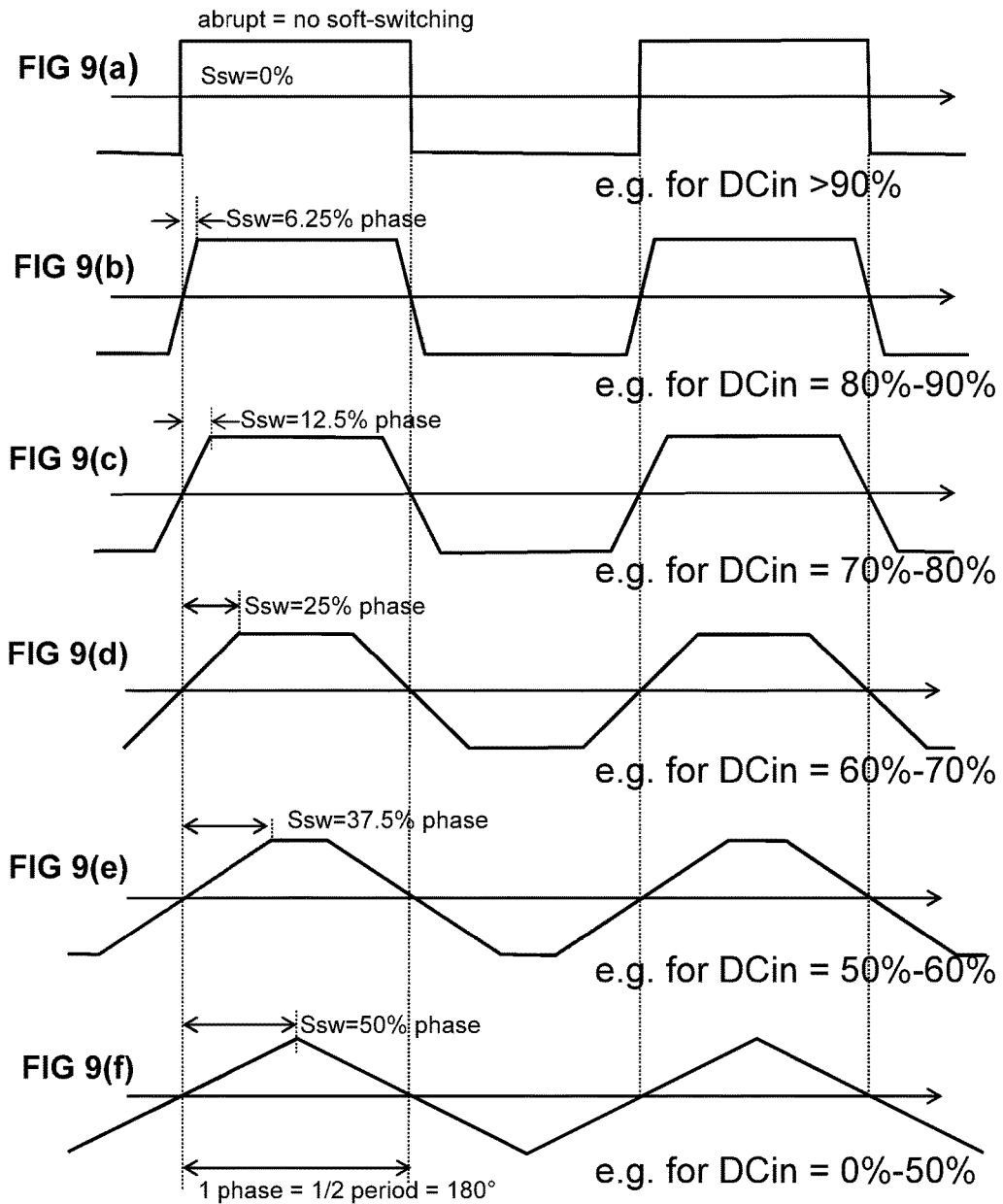

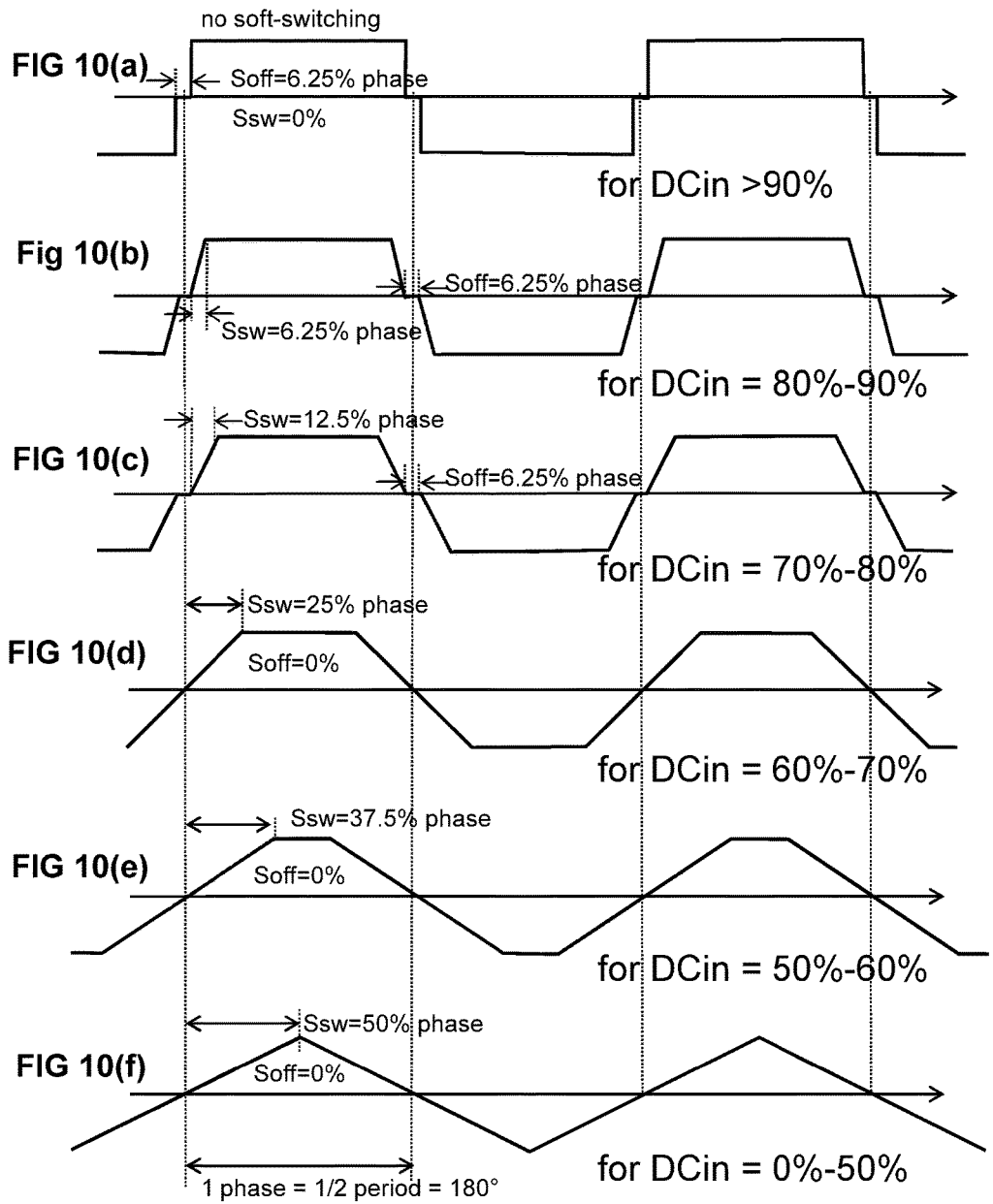

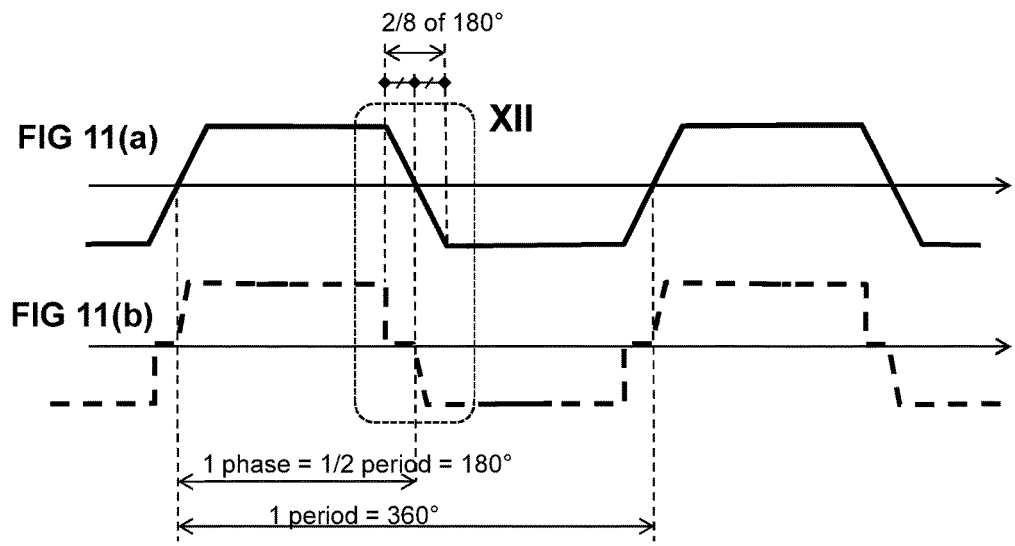
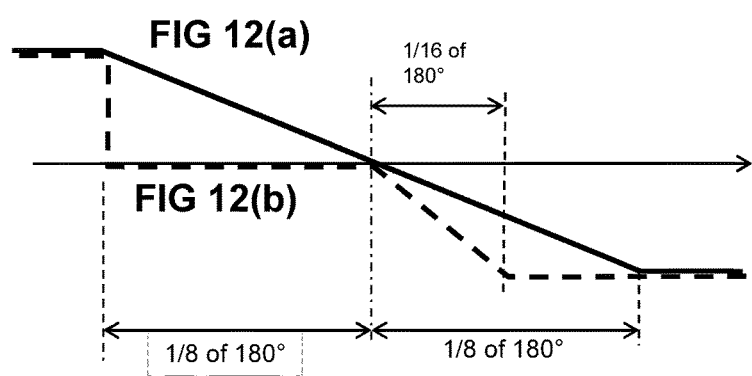

SINGLE PHASE MOTOR DRIVE CIRCUIT AND A METHOD OF DRIVING A SINGLE PHASE MOTOR

FIELD OF THE INVENTION

The present invention relates to the field of single phase (also referred to as single coil) motor drive circuits, and to a system comprising such a circuit, and to a method of driving such a motor.

BACKGROUND OF THE INVENTION

The present invention relates to single phase brushless DC motors, i.e. a motor with a single coil. Single-phase motors are typically used in low cost motor applications, such as fan cooling applications, where typically the speed control loop is closed by a remote CPU, while the motor driver itself basically converts an input PWM signal into an output PWM signal according to some look-up table or transfer function.

For many applications, three phase brushless DC motors are preferred because of their lower torque ripple, leading to lower noise, higher efficiencies and higher start up torque. But single coil motors are cheaper to produce and to drive, and therefore preferred in some high-volume markets, such as e.g. fans for cooling CPU's in desktops, refrigerators, printers, as a few examples only.

Brushless DC motors have the advantage that no brushes are needed, but they require a specific driving scheme, called "electrical commutation" to change the direction of the current through the coil(s), which is a principle well known in the art.

Although there are communalities between single phase brushless DC motors, dual phase brushless DC motors and three-phase brushless DC motors, there are also important differences. A first difference is that the torque of a single-phase or two-phase motor varies quite differently from that of a three phase motor. FIG. 1(a) shows a typical torque as a function of rotational position for a single/dual coil motor, in case of permanent energization of the motor. It is well known in the art that dedicated energization schemes may slightly influence the torque curve to improve torque ripple and noise. These schemes are often referred to as "soft switching" for single/dual coil and "trapezoidal or sine wave control" for three phase BLDC. Dedicated sinusoidal 3 phase motors driven with dedicated sinusoidal energization schemes may even result in virtually zero torque ripple. FIG. 1(b) shows a typical torque as a function of rotational position for a three-phase motor in case of permanent energization.

The fundamental reason for the difference in torque between both motor types is that in a three-phase motor the permanent energization over a full electrical rotation is divided in six regions of 60° each, whereby at least two coils are energized simultaneously in each of the six regions. The current in the coils interacts with the permanent magnetized rotor, leading to the torque curves such as shown in FIG. 1(b). In contrast, in a single coil motor, there is only one coil. During the electrical commutation of this coil the total motor current is decreased to zero before ramping it up again in the opposite direction, which explains why the torque curve of single/dual phase motors always has to pass the zero torque point shown in FIG. 1(a). Brushless Motor control, both for single coil as well as for 3-phase motors, implies the capability to align the electro magnet with the rotor magnet, in other words to align the commutation of the motor current in the stator coil to the position of the rotor magnet. In practice the transition of rotor magnetization from north to south pole requires a certain number of electrical degrees. Because there is no additional coils to provide torque during such transition for single coil motors the possible torque reduces, down to zero at the exact zero crossing. The coil current is defined by the applied supply voltage VDD, minus the back EMF voltage (bemf) induced into the stator coil by the moving rotor magnet, and by the motor parameters Lcoil, Rcoil, and the motor driver resistance. When the magnetic field drops in the transition phase (around the BEMF zero crossing) this will lead to a rise in the coil current. This current cannot interact with magnetic fields, and therefore leads to reduced efficiency. Additionally the current needs time to change direction in the coil. The increased coil current around a BEMF zero crossing will further add to the time required to change the direction of the current, and leads to so called reverse current after commutation. This reverse current causes supply ripple, and generates a braking effect in the fan. The consequent high torque variation causes vibrations and acoustic noise. Soft switching refers to a current control method which aligns the coil current commutation with the rotor position to minimize the above effects.

Another difference is that three phase BLDC motor controllers with sensors require three hall elements located at exactly 60 or 120 electrical degrees to discriminate between the six possible motor states, while single/dual coil motors only require one single hall element to discriminate between the two possible motor states, requiring only limited production mounting tolerances. This allows even to integrate this hall element into the motor driver, leading to further miniaturization and cost reduction.

A specific market requirement of speed control fans is the definition of the speed curve. This speed curve defines how an input signal, for instance a duty cycle input signal (DCin) is converted into a resulting fan motor speed. In case of fan-drivers which control power stages using PWM to control the coil current, the coil energization is the result of a waveform generated. In basic implementations the waveform can consist of a single output duty cycle (DCout). In more complex implementations the waveform can consist of varying output duty cycles in order to realize so called soft switching. For simplicity to refer to both cases, basic and complex, we refer to a single theoretical output duty cycle DCout as a reference of the energization level targeted by the applied waveform. In practice DCout can also be the maximum level of the soft-switching waveform.

Because such low cost fan-drivers don't regulate speed, but only apply a requested output duty cycle (DCout), the speed resulting from the energization depends on the fan design, such as the blade design, and system environment, such as back pressure. The lack of closed loop speed control, and the non-linear increase of the load as a function of the speed, causes that the speed curve is a non-linear function of the output duty cycle (DCout). Several applications accept a natural speed curve in which the percentage value of Dcin is equal to that of DCout. This relationship is quite easy to realize in a state-machine and results in very low-cost speed controlled fan-drivers. Some applications however such as CPU or GPU cooling have more complex requirements.

The latter applications define a start point P1 and an end point P2 of the target speed curve. A linear speed change between those points is requested (desired). And deviations may vary within a given boundary, for instance from +/−200 rpm at P1, to +/−10% at P2. The speed curve starting point P1=(DCin_0, DCout_0) may be requested in a wide range, for instance (0%, 40%) as well as (40%, 10%). In other words, according to the specification, the actual speed curve needs to be located between an upper boundary 42 and a lower boundary 41 (see FIG. 4), which is difficult because the speed curves are typically quite non-linear. Some examples of curves which do, or do not fall between the boundary lines, are shown in FIG. 4. In order to limit inventory of different fan-drivers for different end customer requirements, the speed curve DCout=F(DCin) of state of the art fan-drivers for CPU/GPU cooling fans can be tuned using external components in order to match the requested target speed curve. This leads to larger pin-count packages such as TSSOP16. Attempts to reduce the pin count to SOIC8 imply also reduced tuning capability. An example of such a target speed curve is shown in FIG. 3.

FIG. 2 shows a typical system configuration where a remote processor 21 provides a duty cycle signal (DCin) as a PWM-signal, indicative for the desired fan speed, and whereby the single coil motor driver has to drive a fan motor such that the actual speed of the fan is substantially proportional to the duty cycle value (relative to its maximum speed).

While it would be theoretically possible to implement a closed-loop system in the fan driver, e.g. by embedding a controller with a look-up table to implement a non-linear transfer function that compensates for the non-linear load, such sophisticated solutions are not viable for cost reasons. And while it would be possible to implement the closed loop in the CPU shown in FIG. 2, this is not what the market asks.

It is a challenge to provide a single coil motor driver of low complexity that, when used in combination with a fan motor, provides speed curves located between the specified boundary lines as shown in FIG. 4.

FIG. 5 illustrates how the problem is addressed today, namely by providing fan drivers having multiple linear transfer functions in a duty cycle convertor block converting the "duty cycle input signal" (DCin) into a so called "duty cycle output signal" (DCout), (which actually is an internal signal) and one of these transfer functions is selected by means of external components (e.g. resistors and/or capacitors). In fact, the three fan speed curves shown in FIG. 4 correspond to the three transfer curves shown in FIG. 5 used in conjunction with a particular fan. As can be seen in FIG. 4, only one of the three curves falls between the boundary lines, hence that transfer function would have to be selected for that particular fan to satisfy the requirements.

However, there is room for improvement and/or alternatives.

SUMMARY OF THE INVENTION

It is an object of embodiments of the present invention to provide a good method and a good device for driving a single coil motor.

It is an object of particular embodiments of the present invention to provide a method and a device that accepts a duty cycle signal indicative for a desired fan speed, and that generates a signal for driving a fan in such a way that the resulting speed curve, expressed as the relative speed (related to a maximum speed) versus the duty cycle input, is a curve that lies between an upper boundary line located 10% above, and a lower boundary line located 10% below a predefined target line, whereby the predefined target line passes through a first predefined point P1 located in the lower left quadrant of the graph (i.e. in the part of the graph where DCin<50% and DCout<50%), and a second predefined point P2 located in an upper right quadrant of the graph (i.e. in the part of the graph where DCin >50% and DCout >50%).

It is an object of particular embodiments of the present invention to provide such a single coil motor driver which moreover fits in a chip package having only eight pins, or only six pins, without reducing the chance that, when the single coil motor driver is used in conjunction with a particular fan, the resulting fan speed curve falls between the specified boundary lines of 10% above and below the target line.

It is an object of particular embodiments of the present invention to provide a relatively simple fan driver with an open-loop control, in particular to provide a fan-driver which does not contain a programmable processor.

These objectives are accomplished by a method and device according to embodiments of the present invention.

In a first aspect, the present invention provides a single phase motor drive circuit for driving a single phase motor, the single phase motor drive circuit comprising: a timer unit adapted for receiving a sensor signal indicative of an angular position of a rotor of the single phase motor, and for providing at least one timing signal in phase with the sensor signal; a waveform generator for generating at least one waveform for energizing the single phase motor, the waveform generator being adapted for receiving the at least one timing signal, and for receiving at least one configurable setting, and for generating the at least one waveform based on the at least one timing signal and based on the at least one configurable setting, the at least one configurable setting being selected from the group consisting of a soft switching setting (e.g. Ssw, Ssw_rise, Ssw_fall), a lead angle setting (e.g. Sla) and an off time setting (e.g. Soff, Soff_before, Soff_after); a configuration unit adapted for receiving an input signal indicative of a desired speed of the single phase motor, and adapted for generating the at least one configurable setting as a function of the input signal, and for providing the at least one configurable setting to the waveform generator to dynamically configure the waveform generator as a function of the input signal.

It is an advantage of dynamically changing at least one parameter of the waveform, for example at least a soft switching setting, because the resulting graph of the motor speed (in RPM) versus the input signal, will be a multi-segment curve having at least two segments, resulting in an overall motor behavior (RPM versus input signal) which can better approximate a linear target curve than was possible with prior art solutions.

It is an advantage of changing parameters of the waveform, such as e.g. soft switching, and/or lead angle and/or off-time, because each of these settings can, individually or in combination, influence the resulting acoustic noise.

It is an advantage of embodiments wherein at least two settings (or parameters) are dynamically configured, that different combinations of these parameters can be chosen at different speeds, for example to optimize the overall noise (commutation noise plus noise generated by the wind).

It is an advantage of the present invention that the shape of the waveform is deliberately adjusted on the fly, as a function of the input signal, in contrast to prior art motor drivers, where such parameters are fixed.

The single phase motor drive circuit is ideally suited for use in a fan control system, where the speed curve of the fan (e.g. as illustrated in FIG. 3) needs to satisfy the so called "Intel cooling specification".

It is an advantage that the single phase motor drive circuit can be implemented as an analog circuit or as a digital circuit, or a mixed analog and digital circuit.

It is an advantage that the single phase motor drive circuit can be implemented with simple logic, (e.g. with a state machine using counters and an oscillator), and that no programmable processor is required.

It is an advantage that the silicon area required for such devices is relatively small, which is important to reduce cost in high-volume markets, such as e.g. cooling fans for laptops, cooling fans for VGA video card, etc.

Preferably the single phase motor drive circuit is implemented as an open-loop system. Although it would be possible to choose the at least one configurable parameter (e.g. soft switching and/or lead angle and/or offset) based on the actual speed (RPM) of the motor, (which would require a closed loop system), it is an advantage that the single phase motor drive circuit does not do so, but rather configures the configurable parameter(s) based on the incoming signal, (which may be an analog signal or a digital input signal, e.g. a PWM signal), making it compatible with legacy fan drivers in the market.

The single phase motor driver circuit may be comprised in an integrated semiconductor device.

The waveform may have a plurality of waveform elements, each waveform element being substantially trapezoidal and having a rising edge and a falling edge, subsequent waveform elements having a different polarity. It is an advantage that the at least one configurable parameter is related to a timing and/or a shape of the rising edges and/or the falling edges of the waveform.

It is an advantage that the rising and/or falling edges of the waveform are dynamically configured, because it allows the commutation noise and/or the torque to be different for different motor speeds, for example relative high torque (and moderate noise) at start-up, relatively low noise (and reduced torque) at moderate motor speed, and relatively high torque (and relative high noise) at high motor speed, but other behavior is also possible. In this way, no overall compromise needs to be made between noise and torque, as is typically done in the prior art. Indeed, by dynamically configuring the soft switching, both the advantage of low noise at moderate motor speed, and the advantage of high torque at high motor speed, can be obtained.

It is an advantage that the single phase motor driver circuit is capable of driving motors with different maximum motor speed, for example any motor speed in the range of 1000 RPM to 25000 RPM, for example about 3000 RPM, or about 4500 RPM, or about 6000 RPM, or about 7500 RPM, or about 9000 RPM, or about 12000 RPM, or about 15000 RPM, or about 20000 RPM, or about 25000 RPM.

In an embodiment, the configuration unit is adapted for setting the at least one configurable setting to a first predefined value or first set of predefined values when a characteristic of the input signal is below a first predefined threshold value TH1; and the configuration unit is adapted for setting the at least one configurable setting to a second predefined value or second set of predefined values when a characteristic of the input signal is above a second predefined threshold value TH2, and the second threshold value TH2 is equal to or larger than the first threshold value TH1.

The at least one configurable setting (or parameter), e.g. soft switching timing value, of latency time, or off-time, may be expressed as a percentage of the commutation time (corresponding to a half period: 180 electrical degree), and not as an absolute time value.

The first predefined value or set of first predefined values may be chosen such that the torque is favored at relatively high motor speeds (at which speeds wind-noise exceeds the noise produced by the commutation), and low commutation noise is favored in the midrange, for instance by applying soft switching time which is a higher percentage of the commutation time.

The second threshold value TH2 may be the same as the first threshold value TH1, in which case the resulting speed-curve would be a multi-segment curve without hysteresis.

Alternatively, the second threshold value TH2 may be higher than the first threshold value TH1, in which case the multi-segment curve would provide hysteresis.

It is an advantage of providing hysteresis, because it offers the advantage of more stable operation during actual use, in cases where the input signal would vary slightly around one of the threshold values.

It is an advantage that hysteresis can be implemented in a very simple and very predictable manner.

In an embodiment, the input signal is a duty cycle input signal, and the first threshold TH1 and the second threshold TH2 are values chosen in the range from 10% to 100%, for example in the range of 15% to 95%, or in the range of 20% to 95%, or in the range of 25% to 95%, or in the range of 40% to 80%, or in the range of 50% to 80%, or in the range of 55%-75%.

By locating a threshold value (referred to in the claim as the "first threshold value", but which need not be the lowest threshold value) at a relatively high motor speed, for example at least 40% of the maximum motor speed, or for example at least 60% of the maximum motor speed, a corrective "jump" to another curve segment (with a different) configurable setting can be made, so that the relative speed curve lies closer to "the ideal target line", and the risk of falling outside "the boundary lines" is decreased. (this will be explained further with reference to FIG. 15).

In an embodiment, the single phase motor drive circuit further comprising a duty cycle convertor unit adapted for receiving the duty cycle input signal and for converting the duty cycle input signal to a second duty cycle signal, and for applying the second duty cycle signal to the configuration unit.

In an embodiment, the sensor comprises a Hall element.

Although other ways of determining the angular rotor position may be used (for example an optical sensor connected to the motor axis and an optical decoder), it is an advantage of a Hall element that it is a contactless position sensor, capable of sensing a magnetic field associated with the rotor, thus being robust against wear and dust. The Hall sensor can be external or internal of the single phase motor driver circuit. When embedded or integrated in the same chip as the single phase motor driver circuit, typically three pins can be saved, thus resulting in a smaller package, and thus reducing the cost.

In an embodiment, the timer unit comprises at least one counter.

The timer unit can be implemented in an analog way, e.g. based on charging and discharging capacitors, or in a digital way.

It is an advantage of using a digital implementation, in particular using at least one counter, because it is less sensitive to production variations and operation variations (like supply voltage and temperature changes), and allows more accurate arithmetic, and (if desired) more complex calculations.

In an embodiment, the single phase motor drive circuit further comprises an oscillator for generating a clock signal to the timer unit.

When using one or more counters, a clock signal is needed. The clock signal may be applied from outside, or may be generated inside.

It is an advantage that the clock signal can be implemented by means of a simple oscillator, for example an RC-oscillator. This is possible because the absolute time is not required, but only a relative time. In particular, the soft switching setting can be expressed as a percentage or a fraction of the total phase time. Such oscillator can be easily embedded in the semiconductor device. In this way at least again one package-pin and external circuitry can be saved.

In an embodiment, the single phase motor drive circuit further comprises a drive unit adapted to receive the at least one waveform from the waveform generator, and to provide at least one signal to drive the single phase motor.

The drive circuit may comprise a dual H-bridge, and may be adapted to provide a PWM signal, or may comprise linear FET control.

It is an advantage to embed the drive unit in the motor drive circuit, because in that way external components can be avoided, thus reducing board space, component count, and overall cost.

In an embodiment, the first predefined value is a first counter value or the first set of predefined values is a first set of counter values, and the second predefined value is a second counter value or the second set of predefined values is a second set of counter values, and each of the predefined counter values are integer multiples of 1/N, whereby N is an integer power of 2.

For example, the timing value may be ⅛, 2/8, ⅜, etc. (since 8=2 to the power 3), or 1/16, 2/16, 3/16, etc. (since 16=2 to the power 4), or 1/32, 2/32, 3/32, (since 32=2 to the power 5), etc.

It is an advantage that the time for starting or stopping the rising edge (e.g. soft-switched rising edge) and/or falling edge (e.g. soft switched falling edge) can be easily calculated by simple shift operations, addition or subtraction operations of the one or more counters in the timing unit.

In an embodiment, the at least one configurable setting is a soft switching setting "Ssw" for configuring both rising edges and falling edges of the waveform, or the at least one configurable setting comprises a first soft switching setting "Ssw_rise" for configuring rising edges of the waveform and a second soft switching setting "Ssw_fall" for configuring falling edges of the waveform.

It is an advantage of using only a single soft switching setting that the resulting waveforms are symmetrical.

It is an advantage of using a different setting for the rising edges and the falling edges that it provides more degrees of freedom, and thus higher flexibility, so that the resulting segmented curve can be better fine-tuned towards the target curve.

In an embodiment, the waveform generator is further adapted for receiving at least two configurable settings selected from the group consisting of a soft switching setting, a lead angle setting, and an off time setting; and the configuration unit is further adapted for generating the at least two configurable settings as a function of the input signal, and for providing the at least two configurable settings to the waveform generator.

It is an advantage of this embodiment that two settings can be configured, in particular for example soft-switching and off time, or soft-switching and lead angle, or off-time and lead-angle, or even three settings: soft-switching and off-time and lead-angle. This offers the advantage of another degree of freedom, allowing that the resulting segmented-curve can be further "tuned" to approximate the linear target curve even better.

In an embodiment, the single phase motor drive circuit is embedded in a packaging having at most eight pins.

It is an advantage of a single phase motor drive circuit embedded in a packaging having eight pins or less, because for this kind of devices the package cost is a considerable part of the total cost, hence by reducing the number of pins, the total cost can be reduced. This is possible by integrating for example the sensor and/or the clock generator and/or the drive circuit, and preferably all of them.

Although it is possible to embed such a motor driver in a package with only six pins, it is an advantage of providing a package with less than nine but more than six pins, in that it still allows some form of fixed configuration of the motor driver circuit. For example, the motor driver circuit may implement two or more multi-segment curves, one of which may be selected via external components connected. Or in case of a analog implementation, the one or more pins may be used to determine "how strong" the configurable parameter is varied.

In an embodiment, the single phase motor drive circuit further comprises a Hall sensor and the drive unit, and is embedded in a packaging having only six pins.

It is a major advantage of such an embodiment that it allows the price of the solution to be reduced even more, while at the same time, the chance that the resulting relative motor speed curve falls between the two boundary lines of the "Intel requirements spec" is increased, or that the range of motors for which said motor speed. Or stated in other words, that the range of motor types for which the relative speed curve will satisfy the "Intel requirements spec" is broadened.

It is also an advantage that no (or less) configurations need to be tested by means of external components, because the multi-segmented curve is designed for correcting at least partly the non-linearity of the speed curve.

In a second aspect, the present invention relates to an assembly comprising: a single phase motor driver according to the first aspect; a fan comprising a single-coil motor, whereby an output of the single phase motor driver is connected to an input of the motor for providing power; the assembly having a input for receiving an input signal indicative of the desired speed of the fan, e.g. relative to a maximum speed of that particular fan.

In an embodiment, the input signal is a duty cycle input signal, and the single phase motor driver is adapted such that a curve of the relative speed of said motor compared to its maximum speed, versus the duty cycle input signal falls between an upper boundary line and a lower boundary line located respectively 10% above and 10% below a predefined imaginary target line passing through a first predefined point P1 located on the left and below a point with coordinates 50%, 50% in the relative speed versus duty cycle input graph, and a second predefined point P2 located on the right and above the point with coordinates 50%, 50%.

It is an advantage of using the single phase motor drive circuit of the present invention that the single phase motor drive circuit deliberately does not have a linear transfer function of output power in function of duty cycle input, but provides a higher power signal, which deviates more from the linear power signal as the duty cycle signal (and thus the motor speed) increases, for at least partly compensating the non-linear behavior of the single phase motor. This results in a curve of motor speed (RPM) versus duty cycle input which approximates the "ideal linear curve" better.

In a third aspect, the present invention relates to a cooling system comprising: an assembly according to the second aspect; a processor having an output for providing a duty cycle signal as an input signal to the assembly.

In a fourth aspect, the present invention relates to a method of driving a single phase motor, comprising the steps of: receiving a sensor signal indicative of an angular position of a rotor of the single phase motor; generating at least one timing signal in phase with the sensor signal, and providing said at least one timing signal to a waveform generator; receiving an input signal indicative of a desired speed of the single phase motor; generating at least one configurable setting as a function of the input signal, and providing the at least one configurable setting to the waveform generator, the at least one configurable setting being selected from the group consisting of a soft switching setting (e.g. Ssw, Ssw_rise, Ssw_fall), a lead angle setting (e.g. Sla) and an off time setting (Soff, Soff_before, Soff_after); generating at least one waveform for energizing the single phase motor based on the at least one timing signal and based on at least one configurable setting.

It is an advantage that by this method at least one setting of the generated waveforms is dynamically adjusted as a function of the input signal.

In an embodiment, generating at least one configurable setting comprises: setting the at least one configurable setting to a first predefined value or first set of predefined values when a characteristic of the input signal is below a first predefined threshold value TH1, and setting the at least one configurable setting to a second predefined value or second set of predefined values when a characteristic of the input signal is above a second predefined threshold value TH2, whereby the second threshold value TH2 is equal to or larger than the first threshold value TH1.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 1(a) shows a typical torque of a single-coil motor, and FIG. 1(b) shows a typical torque of a three-phase motor, as a function of angular rotor position.

FIG. 2 shows a fan cooling system known in the art, comprising a processor, and a driver and fan assembly, the assembly comprising a single coil motor driver and a single coil fan motor.

FIGS. 9(a)-9(f) illustrate examples of different waveform patterns, as may be generated by a single-coil motor driver according to the present invention. The patterns shown in FIG. 9 have a configurable soft switching rising and falling edge.

FIGS. 10(a)-10(f) illustrate another example of different waveform patterns, as may be generated by a single-coil motor driver according to the present invention. The patterns of FIG. 10 have a configurable soft switching rising and falling edge and a configurable dead zone (also known as off-zone). The dead zone is non-zero for at least one of the patterns.

FIGS. 11(a)-11(b) illustrate another example of different waveform patterns, as may be generated by a single-coil motor driver according to embodiments of the present invention.

FIGS. 12(a)-12(b) shows part of FIG. 11 in more detail.

Figure 3:
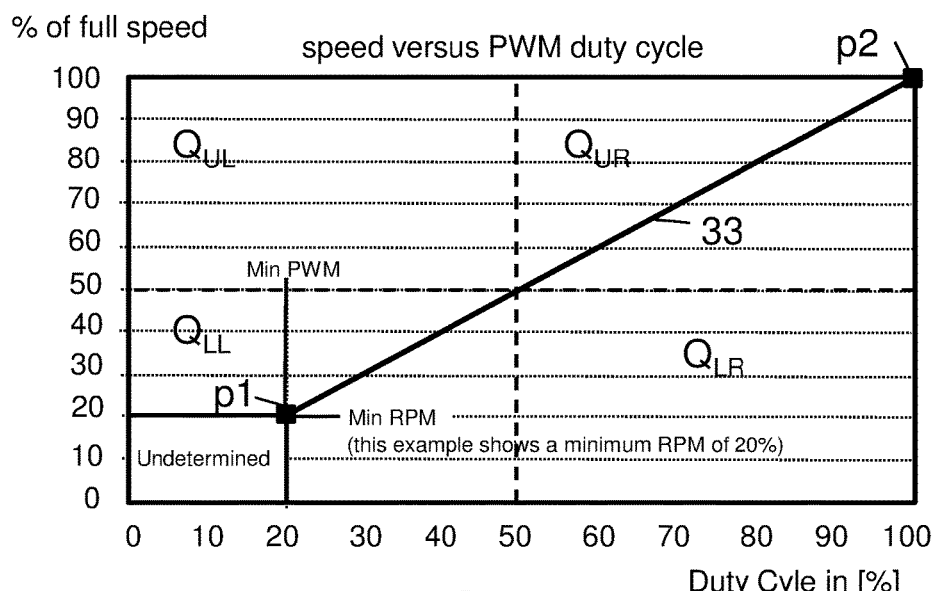
FIG. 3 shows an ideal speed versus duty-cycle curve, as the ideal behavior of the driver and fan assembly shown in FIG. 2 (as one of the examples of the "Intel DIY spec (2005)", envisioned by the present invention.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in this document reference is made to "phase" or "half period", reference is made to the time the rotor needs to turn over 180° electrical degrees.

FIG. 1(a) shows a typical torque of a single-coil motor, and FIG. 1(b) shows a typical torque of a three-phase motor, as a function of angular rotor position, and was already discussed in the background section. Actually, these curves show the torque when no soft-switching is applied.

FIG. 2 shows a fan cooling system, as can be used for example in a laptop, or for cooling head lights, or for ventilating seats in automotive applications, and was already discussed in the background section.

FIG. 3 shows a requirement specification of the "driver and fan assembly" 22 shown in FIG. 2. This requirement is known in the art as an example of the so called "Intel cooling specification", the relevant parts are explicitly mentioned in this document. Although not shown in FIG. 3, the specification allows a tolerance margin of +/−10% above and below the target line 33, as will be described further (see FIG. 4). The horizontal axis shows input duty cycle DCin, expressed in %. The vertical axis shows the fan speed, relative to the maximum fan speed obtainable by a particular fan, and is also expressed in %.

Added to the drawing are four quadrants: a lower left quadrant QLL (where DCin <50%, and relative output speed <50%), a lower right quadrant QLR, an upper left quadrant QUL, and an upper right quadrant QUR. A first point P1 is chosen in the lower left quadrant QLL and a second point P2 is chosen in the upper right quadrant QUR. The first point P1 may be chosen for example at coordinates (0%, 10%) or (0%, 40%) or (10%, 10%) or (10%, 40%) or (25%, 40%) or (50%, 40%), or another predefined point in the lower left quadrant QLL. The second point P2 may be chosen for example at (100%, 100%), or a point in the vicinity of (100%, 100%), for example (98%, 98%). A straight target speed line 33 is drawn between the first point P1 and the second point P2, and an upper boundary line 42 (see FIG. 4) is drawn 10% above said target line 43, and a lower boundary line 41 is drawn 10% below the target line 43. The behavior of the fan assembly 22, and thus of the fan driver, for input signals DCin on the left of the first point P1, is irrelevant. In the example shown in FIG. 3 and FIG. 4, the first point P1 is located at (20%, 20%), hence the behavior is only specified for duty cycle input values DCin higher than 20% in these examples.

Figure 4:
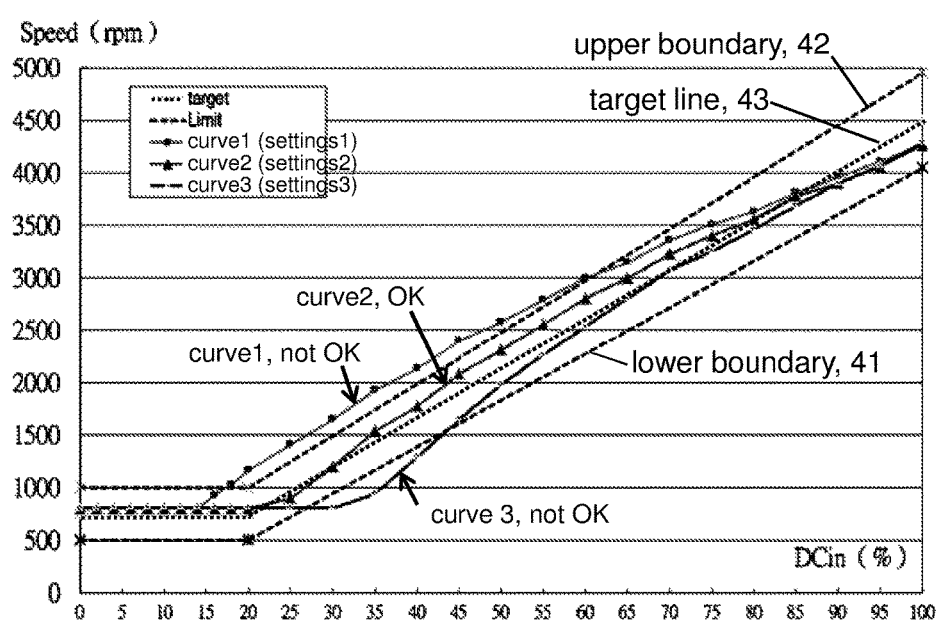
FIG. 4 illustrates the ideal speed curve for an exemplary fan having a maximum speed of about 4500 RPM, and the two corresponding boundary lines (10% higher and 10% lower). It also shows three actual curves representing the behavior of said fan when used in combination with a prior art single coil motor driver integrated circuit, configured with three different settings. Only one of the curves falls between the boundaries, and thus satisfies the requirements.

FIG. 4 illustrates the ideal speed curve ("target line 43") for an exemplary fan having a maximum theoretical speed of 4500 RPM, but in practice has a maximum speed of 4200 RPM (when driven at 100%). Also shown are the two boundary lines 42, 41 located 10% higher and 10% lower than said target line 43. FIG. 4 also shows three curves curve1, curve2, curve3 representing the behavior of said fan when used in combination with a prior art single coil motor driver IC, configured in three different ways. As can be seen, only curve2 falls between the boundary lines 41, 42, and hence satisfies the requirements.

Figure 5:
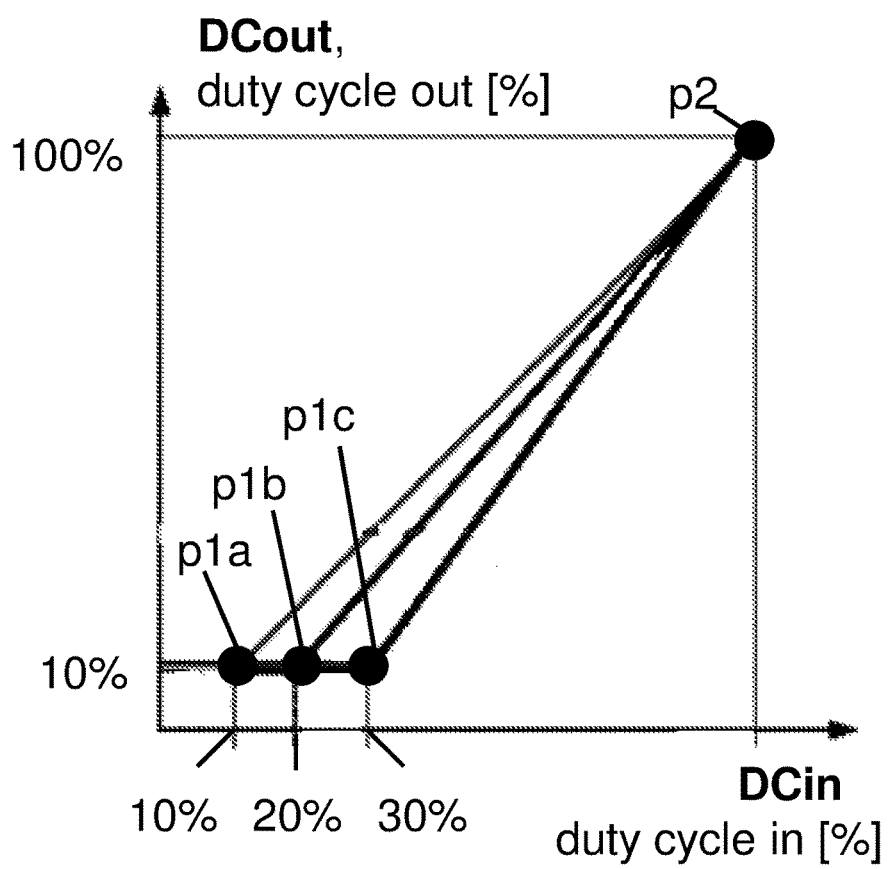
FIG. 5 shows three linear transfer characteristics of the prior art single-coil motor driver circuit used in FIG. 4, whereby a particular transfer characteristic can be selected by means of passive components (e.g. resistors and/or capacitors).

FIG. 5 shows three transfer characteristics of a configurable prior art single-coil motor driver, whereby a particular transfer characteristic can be selected by means of external components, such as e.g. resistors and/or capacitors mounted on a PCB, and connected to one or more pins of the motor driver IC. As can be seen, the transfer characteristics are substantially linear, because that is the simplest implementation for the envisioned kind of single-coil motor drivers, which are implemented as an open-loop system (despite the fact that they actually measure a phase timing, hence a speed of the motor, in order to determine an appropriate timing for commutation).

In the example shown in FIG. 5, the three linear curves (transfer functions) all pass through the second working point P2, located in this example at (100%, 100%), but "start" from different first working points for low speed RPM, P1a being located in the example at (10%, 10%), P1b at (20%, 10%) and P1c at (30%, 10%) respectively, but other first working points may also be used. In practice, for each particular type of fan, several transfer curves of the motor driver are "tested" by trial and error, and the best curve is then selected by means of external components (typically resistors and/or capacitors).

Such motor drivers are commercially available from several vendors (for example the low-noise motor drivers MLX90287 and MLX90297 from Melexis), and their working principles are known in the art. If no soft switching is used, the drive signal can be directly derived from the position signal, in a simple manner. However, in many applications low-noise is required, and is achieved by applying so called "soft switching", which means that the drive signals are not changed abruptly when the rotor passes the transition zone between the north and south pole, but are generated with a "gently changing" rising edge and/or falling edge, for example with a linear function, or a stair-case function or a sinusoidal function, or the like. The aspect of soft switching per se is well known in the art. Such low-noise motor drivers typically comprise some kind of waveform generator to generate trapezoidal waveform signals substantially in phase with the angular rotor position, based on a timing signal.

Prior art motor drivers come in two flavors: analog or digital. In analog implementations, the timing is typically implemented in an analog manner (e.g. by charging or discharging one or more capacitors). In digital implementations, the timing is typically implemented by means of counters adapted for counting a clock signal. Such timing information allows to predict the start position (start time) of the rising edge and the start position (start time) of the falling edge, based on the timing of the previous rotation.

As far as is known to the inventors, however, such low noise shaping is hitherto always implemented in a fixed manner. For example, the duration of the soft switching rising edge and falling edge of the substantially trapezoidal waveform may be fixed at for example 12.5% (or any other fixed percentage) of the phase timing. This means that the absolute time duration of the rising or falling edge will vary (linearly) with motor speed, but that the relative time of the rising or falling edge remains fixed, for example 12.5% of the phase timing, irrespective of the actual motor speed.

Although such curves are very well suited for driving a single coil motor with adjustable speed and with low commutation noise, the problem remains however, that for each type of fan, the developer has to find (e.g. by trial and error) which settings provide a curve located between the two boundary lines 41, 42 (see for example FIG. 4) in order to satisfy the requirements.

The inventors of the present invention came to the idea of, rather than providing a configurable motor driver with several curves (as shown in FIG. 5), one of which is selectable by means of external components (e.g. resistors and/or capacitors), to provide a single-coil motor driver which itself makes that selection dynamically, depending on the motor speed, or more exactly, as a function of the duty-cycle input signal DCin. As far as is known to the inventors, this concept is not offered by the prior art. The effect hereof is that the fan speed does not follow one of the curves show in FIG. 4 and FIG. 14 (for example), but that a speed curve is obtained which is composed of multiple curve segments, see example of FIG. 15 (without hysteresis) or FIG. 16 (with hysteresis). By properly designing the single coil motor driver, e.g. by properly choosing the segments, the resulting speed curve will fall, or at least has an increased chance of falling, between the upper and lower boundary lines 41, 42.

An advantage of the present invention is that the "segmented curve" is located closer to the "target line", which makes the fitting between the two boundary lines much more predictable.

Figure 6:
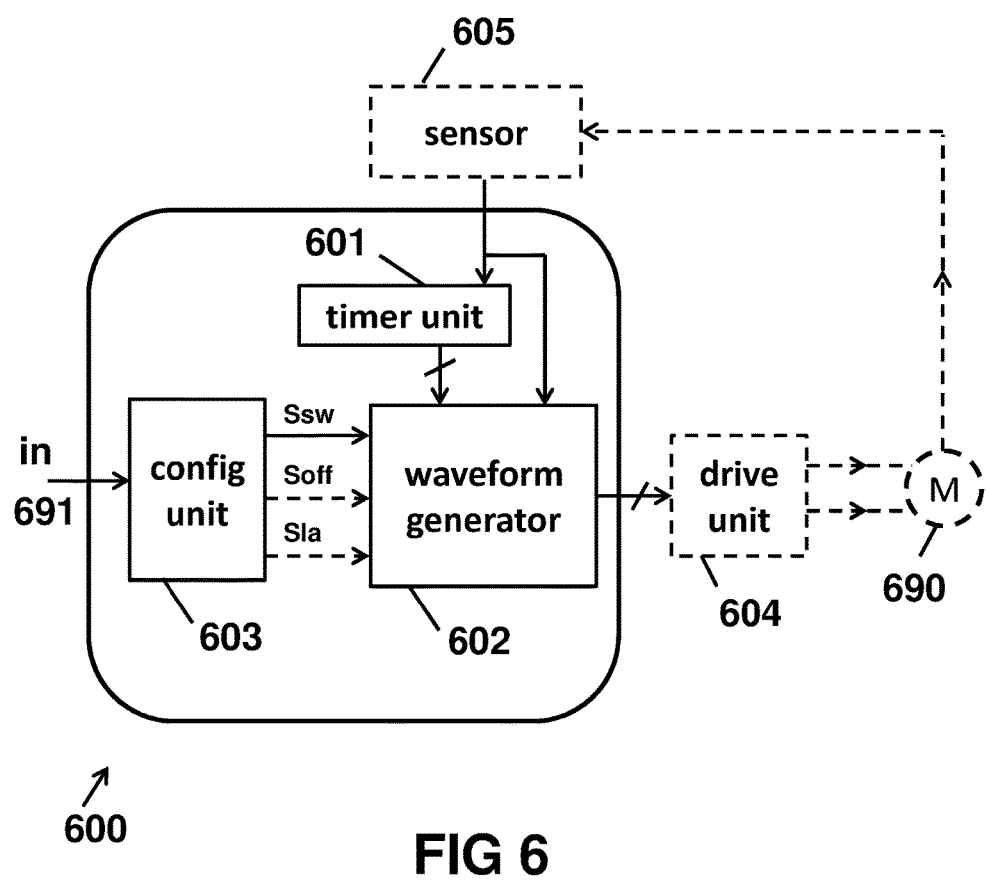
FIG. 6 shows a block-diagram of a first exemplary embodiment of a single-coil motor driver according to embodiments of the present invention.

FIG. 6 shows a block diagram of an embodiment of a single phase motor driver circuit 600 according to the present invention.

The device 600 comprises at least a waveform generator 602 for generating one or more waveform patterns for energizing the motor 690, and a timer unit 601 for generating one or more timing signals, and a configuration unit 603 for dynamically generating or varying one or more configuration parameters or settings, depending on the value of an input signal 691, and for applying the setting(s) to the waveform generator 602. These elements are preferably integrated in a single chip.

The motor driver circuit 600 further comprises a sensor 605 for sensing an angular position of the motor 690 to be driven, which sensor 605 may be integrated in the same chip, or could be an external circuit (hence indicated in dotted line) providing the angular position signal via one or more pins. The sensor 605 may e.g. be an optical sensor or a magnetic sensor arranged for detecting a magnetic field originating or corresponding to the rotor position, or any other suitable sensor. The sensor 605 is preferably a contactless sensor.

The motor driver circuit 600 may further comprise a drive unit 604 for energizing the motor 690, which drive unit may be integrated in the same chip, or could be an external device, or could even comprise a plurality of individual components.

The configuration unit 603 can be seen as a "wave configuration unit", that configures one or more settings or characteristics or parameters of a "normalized waveform", generated by the waveform generator 602, such as for example parameters related to the timing and/or the shape of the rising edge and/or the falling edge of a substantially trapezoidal waveform.

The settings may for example be selected from the group consisting of: a soft switching setting Ssw, a lead angle setting Sla, and an off time setting Soff. The one or more settings Ssw, Sla, Soff may be provided as (an) analog or digital signal(s) or value(s).

The setting "Ssw" may for example represent the relative time of the rising and/or falling edge of the waveform pattern, expressed as a percentage of a half period ("half period" is also referred to as "phase" or as "180°"), in which case a relatively large value (e.g. 25%=¼, see FIG. 9(d)) of the setting "Ssw" would mean a "gentle" ramp-up or ramp-down, and a relatively small value (e.g. ⅟₁₆, see FIG. 9(b)) would mean a less gentle, and thus more abrupt change, and a value of 0% would mean an abrupt change (no soft switching, see FIG. 9(a)).

The setting "Soff" may for example represent the relative time (expressed as a percentage of the phase) that the waveform signal is zero before and/or after the zero-crossing.

The setting "Sla" may for example represent the relative time (expressed as a percentage of the phase) by which the waveform is shifted with respect to a sensor signal.

In a particular embodiment the parameter Ssw is dynamically adapted as a function of the input signal 691, while the parameters Sla and Soff are fixed. Of course, in an actual implementation, a fixed "Soff" and a fixed "Sla" need not be generated and provided by the configuration unit 603, but can be hardcoded or hardwired in the actual implementation of the waveform generator 602, in manners known in the art.

In a particular embodiment the parameter Sla is dynamically adapted as a function of the input signal 691, while the parameters Ssw and Soff are fixed.

In a particular embodiment the parameter Soff is dynamically adapted as a function of the input signal 691, while the parameters Ssw and Sla are fixed.

In a particular embodiment the parameters Ssw and Sla are dynamically adapted as a function of the input signal 691, while the parameter Soff is fixed.

In a particular embodiment the parameters Ssw and Soff are dynamically adapted as a function of the input signal 691, while the parameter Sla is fixed.

In a particular embodiment the parameters Soff and Sla are dynamically adapted as a function of the input signal 691, while the parameter Ssw is fixed.

In a particular embodiment the parameters Ssw and Soff and Sla are dynamically adapted as a function of the input signal 691.

The waveform generator 602 then generates waveform patterns taking into account these settings, for example Ssw, Soff, Sla, and taking into account one or more timing signals generated by the timer unit 601, in phase with the rotor position.

Although the block diagram of FIG. 6 only shows a single soft-switching setting "Ssw" for dynamically configuring the timing (e.g. duration) of the rising edge and falling edge of the waveform pattern, the timing of the rising and falling edge need not necessarily be the same, and it is also contemplated that the configuration unit 603 may provide two separate soft switching settings, for example a first soft switching signal or value "Ssw_rise" for dynamically configuring the rising edge of the waveform, and a second soft switching signal or value "Ssw_fall" for dynamically configuring the falling edge of the waveform, and the waveform generator 602 would be adapted accordingly. In particular embodiments where no soft switching is applied, both the parameters Ssw_rise and Ssw_fall could be fixed. In a particular embodiment where soft switching is applied, one of the parameters Ssw_rise or Ssw_fall could be dynamically configured, while the other parameter is fixed. In a particular embodiment both parameters Ssw_rise and Ssw_fall are dynamically configured.

By using separate settings for the rising and falling edge of a waveform, it is for example possible to generate a waveform with an abrupt falling edge (corresponding to a 0% soft-switching), while the rising edge may for example be a soft-switching rising edge, for example having a duration of ⅟₁₆=6.75% of a phase (as shown for example in FIG. 11(b)). In case of two soft switching parameters Ssw_rising and Ssw_falling, both may be dynamically configured, or only one of them may be dynamically configured, while the other may be a fixed percentage. As used herein, the expression "soft switching setting" may refer to any of the signals or values "Ssw", "Ssw_rise" and "Ssw_fall", depending on the context. It should also be mentioned that several different forms of soft-switching exist, for example linear, or stepwise (also known as "staircase"), or sinusoidal, any of which may be used in embodiments of the present invention.

The same applies to the parameter "Soff". If a single parameter "Soff" is provided to the waveform generator, then, in a symmetrical implementation the waveform is zero shortly before and shortly after the "zero-crossing-point", but embodiments of the present invention are not limited thereto, and it is also possible to provide an "Soff_before" and a "Soff_after" parameter for indicating the percentage of phase timing that the waveform is to be zero before respectively after the zero-crossing point, as indicated for example by references 121 and 122 in FIG. 12 for the waveform corresponding to that of FIG. 11(b). Both of these parameters may be dynamically configured, or alternatively one of them may be held at a fixed percentage.

It is specifically contemplated that all variants of the soft-switching parameters (Ssw, Ssw_rise, Ssw_fall) can be combined with all variants of the off-timing parameter (Soff, Soff_before, Soff_after). For example, in a specific embodiment, Ssw and Soff may be provided to the waveform generator, and both Ssw and Soff would be dynamically configurable. In another specific embodiment, four parameters would be provided: Ssw_rising, Ssw_falling, Soff_before, and Soff_after, but only Ssw_rising and Soff_after would be dynamically configured. It will be clear to the skilled person that other combinations are also possible.

The timer unit 601 may provide multiple timing signals in phase with the sensor signal, for example, a first timing signal for starting a rising edge of the generated waveform, a second timing signal for ending the rising edge of the waveform, a third signal for starting a falling edge of the waveform, a fourth signal for ending the falling edge of the waveform, etc.

The input signal may be an analog signal or a digital signal, for example a PWM signal. The PWM signal may indicate the relative desired motor speed compared to a maximum achievable motor speed. The input signal DCin may e.g. be a PWM-signal coming from an external processor 21 (see FIG. 2).

According to an important aspect of the present invention, the at least one configurable parameter is adapted depending on the value of an input signal 691, directly or indirectly. In other words, the at least one configurable parameter Ssw, Sla, Soff is derived from, or based on, directly or indirectly, the value of the input signal 691.

According to an advantageous aspect of the present invention, the configuration unit 603 is adapted to provide at least two different values (or sets of values) for the dynamically configured setting, depending on the value of the input signal, e.g. depending on whether the input signal is or represents a value lower or higher than a first threshold TH1. For example in FIG. 11, waveform (a) may be generated for a first range of input signals, and waveform (b) may be generated for a second range of input signals. In other embodiments, the configuration unit 603 may be adapted to provide at least three, or at least four (see FIG. 15), or at least five, or at least six (see FIG. 9 or FIG. 10), or at least seven (see FIG. 13) different signals/values or sets of signals/values depending on the value of the input signal (e.g. duty-cycle input signal DCin). In some embodiments, the configuration unit 603 may even be adapted to provide one or more "continuously varying" values, for example in an analog implementation.

The one or more waveforms generated by the waveform generator 602 may be provided to a drive unit 604, which may be part of the single coil motor driver 600, but that is not absolutely required, and the drive unit 604 may also be an external unit. The drive unit 604 may comprise for example a double H-bridge for energizing the single phase motor coil, in one or in the opposite direction. The drive unit 604 may convert the waveform into PWM output signals in a manner which is known per se in the art, which PWM output signals may be connected to the terminals of the single-coil motor 690, preferably using a clock signal higher than 20 kHz, which may be generated by the timer unit 601, or be generated in another way.

The waveform generator 602 is adapted for generating a waveform (or adjusting a normalized waveform) by taking into account the dynamically configured and/or fixed settings, as well as timing information (corresponding to the actual motor speed), and polarity information received from the angular position sensor 605. Examples of waveforms that can be generated by the waveform generator will be discussed further (FIG. 9 to FIG. 13).

Figure 7:
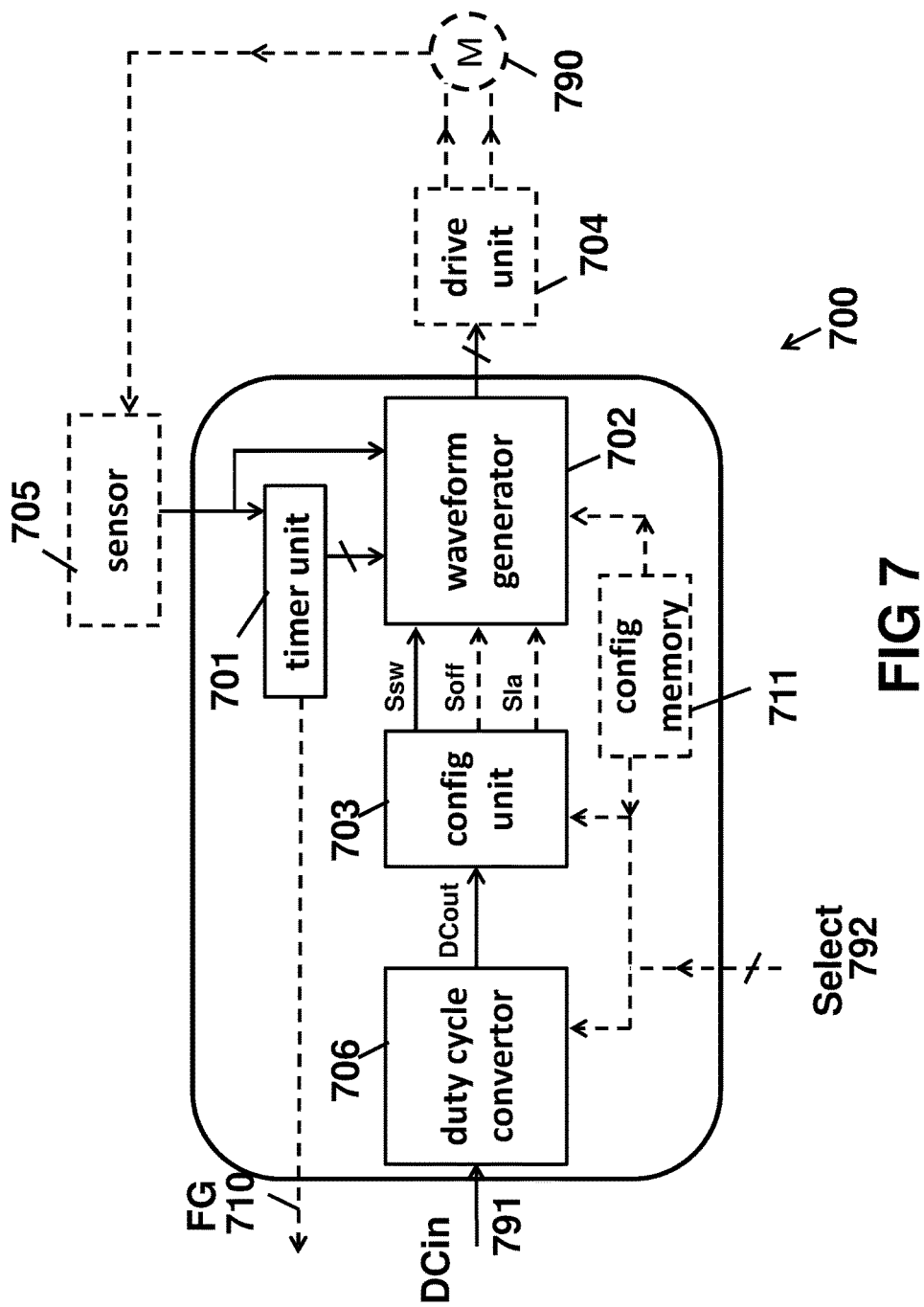
FIG. 7 shows a block-diagram of a second exemplary embodiment of a single-coil motor driver according to the present invention.

FIG. 7 shows a variant of the motor drive circuit shown in FIG. 6. Everything which was mentioned for the embodiment of FIG. 6 is also applicable to the embodiment of FIG. 8, unless specifically mentioned otherwise. The circuit 700 of FIG. 7 further comprising a duty cycle convertor unit 706, also referred to herein as a "DCout-generator", adapted for converting an input duty cycle signal DCin to an output duty cycle signal DCout (which actually is an internal signal of the motor driver circuit). Implementations of this functional block are known per se, and a typical behavior of such a duty cycle convertor unit 705 was already discussed in relation to FIG. 5.

Although not absolutely necessary, the duty cycle convertor block 706 typically also has a static "selection" input 792 to define how to convert the DCin signal to the DCout signal, for example to select one of the curves of FIG. 5. This selection can for example be implemented by connecting one or more external resistors and/or capacitors to one or more of the package pins. Alternatively the selection could also be implemented by "internal configuration means", such as for example by using a non-volatile programmable memory 711 (e.g. flash), or by blowing internal fuses (for example in an End-Of-Line configuration), or in any other way. The static selection means may also select the shape of the rising and/or falling edge, for example: linear or staircase or sinusoidal, or any other suitable shape.

As can be seen FIG. 7, the configuration unit 703 receives the DCout signal as duty cycle input signal for generating the one or more of the parameters Ssw (or Ssw_rise and/or Ssw_fall), Soff (or Soff_before and/or Soff_after), Sla. But since DCout itself is derived from DCin, the settings are thus actually based on the input signal DCin, albeit indirectly.

Optionally, the static selection input 792 or the internal configuration memory 711 may also be used to select one or more of the fixed parameters of the configuration unit 703 or of the waveform generator 702.

Optionally the circuit 700 may further comprise a feedback signal 710, known in the art as "FG" (which stands for Frequency Generator), indicative of the actual speed of the motor. This signal may be provided to the motor controller 21 shown in FIG. 21, which may, but need not use this signal in a closed loop system.

It should be noted that the duty cycle convertor block 706 is not absolutely necessary, and when omitted, the DCout signal would be identical to the DCin signal, a mode which is known in the art as the "natural curve" or "direct PWM", see for example the curve running through the point "p1a" and "p2" in FIG. 5.

Of course, the speed feedback signal 710 and/or the static configuration lines 792, and/or the internal configuration memory 711 could also be added to the circuit shown in FIG. 6, but FIG. 6 was deliberately kept as simple as possible.

Figure 8:
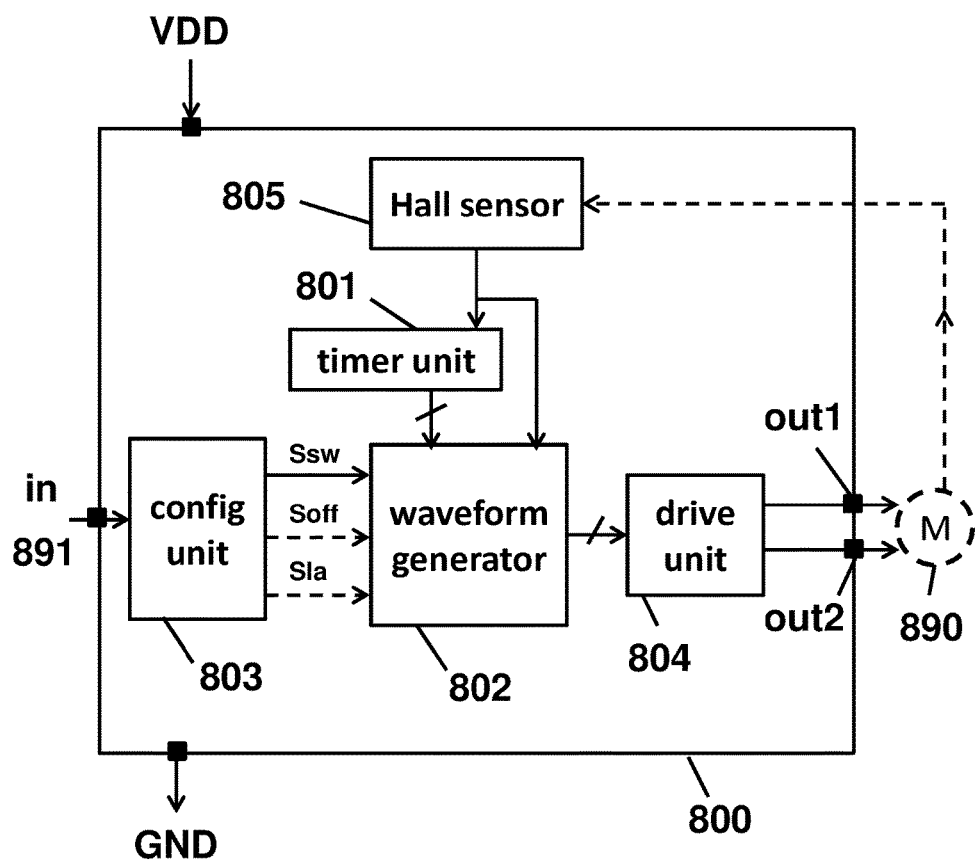
FIG. 8 shows a block-diagram of a third exemplary embodiment of a single-coil motor driver according to the present invention, embedded in a chip-package having only six pins (only five pins are shown).

FIG. 8 shows a variant of the single phase motor drive circuit of FIG. 6, integrated in a a single chip. Everything which was mentioned for the embodiment of FIG. 6 is also applicable to the embodiment of FIG. 8, unless specifically mentioned otherwise. The device 800 comprises a waveform generator 802 and a timer unit 801 and a configuration unit 803. In addition, the device 800 further comprises an embedded Hall sensor 805 and an embedded drive unit 804. It is an advantage that a single chip solution may be provided offering this functionality.

In case of a digital implementation, the device 800 may further comprise an oscillator (not shown), e.g. an RC oscillator for generating an internal clock signal, which is applied to the timer unit 801, and the timer unit 801 may comprise one or more digital counters.

The drive unit 804 may comprise a dual H-bridge, as is known per se in the art.

In a particularly embodiment, the device 800 is implemented in a chip package having only eight pins, or having only six pins (only five pins are shown in FIG. 8). The sixth pin may for example be used to output a speed signal, like the FG signal shown in FIG. 7.

In a variant (not shown) of the motor drive circuit of FIG. 8, the motor drive circuit 800 may further comprise a duty cycle convertor such as the block 706 of FIG. 7. Optionally this variant may further comprise "select pins" (similar to FIG. 7) or an internal configuration memory (similar to FIG. 7) for statically configuring parts of the chip, for example the duty cycle convertor and/or the configuration unit and/or the waveform generator. The package could be a 16 pins package, or an 8 pins package or even a package having only 6 pins.

FIG. 9 to FIG. 13 show several examples of (normalized) waveform patterns as can be generated by the waveform generator 602, and will be discussed further. For easy of description, in what follows, it will be assumed that the input signal is a duty cycle input signal DCin, e.g. a PWM signal, but as explained above, that is not absolutely necessary for the present invention.

FIG. 9(a) to FIG. 9(f) show six different waveform patterns, as can be generated by the waveform generator 603, 703, 803. In the examples of FIG. 9, there is only one setting being modified, namely the soft-switching parameter "Ssw", which (in this example) is equal for the rising edges and the falling edges of the generated waveforms. Manners for generating such waveforms are known per se in the art, either analog or digital, but according to an advantageous aspect of the present invention, the soft-switching parameter or setting is dynamically varied depending on the duty-cycle input signal "DCin" directly (as in FIG. 6 and FIG. 8), or indirectly (as in FIG. 7).

As a specific example, embodiments of the present invention not being limited thereto, the configuration unit 603, 703, 803 may for example provide a setting Ssw=50%=½ if the duty-cycle input lies in a first range, for example in the range of 0% to 50%, so that the waveform generator 602, 702, 802 will generate the curve of FIG. 9(f). As is well known in the art, such a waveform will result in a very low noise operation of the fan, thanks to the soft-switching, but will also provide a very low torque. If the duty-cycle input would increase to a value in the range of for example 50% to 60%, the configuration unit 603, 703, 803 would generate a setting Ssw=37.5%=⅜, resulting in the waveform pattern shown by curve of FIG. 9(e), which generates slightly more torque and slightly more commutation noise. If the duty-cycle input DCin would increase to a value in the range of for example 60% to 70%, the configuration unit 603, 703, 803 would generate a setting Ssw=25%=¼ resulting in the curve of FIG. 9(d), etc. If the duty-cycle input would increase to a value in the range of for example 90% to 100%, the configuration unit 603, 703, 803 would generate a setting Ssw=0%, corresponding to the waveform of the curve of FIG. 9(a), meaning that there is no soft-switching applied anymore, but an abrupt change from maximum positive to maximum negative voltage. The inventors are well aware that the pattern of the curve of FIG. 9(a) will result in more commutation noise, but at a 90% fan speed (or higher), the noise caused by the moving air is typically higher than that of the commutation noise. A configuration unit 603, 703, 803 providing the six waveforms of FIG. 9(a) to FIG. 9(f) offers the advantage that the motor is very silent at relatively low motor speed (e.g. for DCin below 50%), and has a relatively good, e.g. increased torque at relative high motor speeds (e.g. for DCin higher than 75%), and has maximum torque at maximum input signal (e.g. for DCin higher than 90%). As far as is known to the inventors, such a combination is not offered by the prior art, because in case a fixed setting soft switched setting is used, one always had to make a comprise: either low noise (both at low and high speed) or high torque (both at low and high speed), but not the combination of low noise (at low speed) and high torque (at high speed).

In an alternative embodiment, the waveform of FIG. 9(b) could for example be applied to the range of DCin from 80% to 100%, thereby avoiding the abrupt changes and corresponding increased noise generated by the waveform of FIG. 9(a).

It will be understood that the present invention is not limited to the particular values of the soft-switching percentages "Ssw" shown in FIG. 9, nor to the exemplary ranges of the duty cycle input in which they are applicable, and of course other values and/or other ranges could also be used; whilst obtaining the same advantageous effect in terms of low or reduced noise at relatively low speed and high or increased torque at relatively high speed. The important aspect is that at least one setting (in the example of FIG. 9, the parameter "Ssw") is not fixed to a predefined value, for example 12.5%, but is dynamically changed as a function of the duty cycle input signal. And as already described above, the present invention is not limited to configuration units 603, 703, 803 providing six different settings (corresponding to six different waveform patterns), but more than six different settings, or less than six different settings may also be used. For example, in a variant of FIG. 9, the configuration unit 603, 703, 803 may be configured for providing only four different settings, for example "Ssw"=50% for Dcin=0% to 60%, and "Ssw"=37.5% for Dcin=60% to 75%, and "Ssw"=12.5% for Dcin=75% to 85%, and "Ssw"=6.25% for Dcin=85% or higher.

Figure 14:
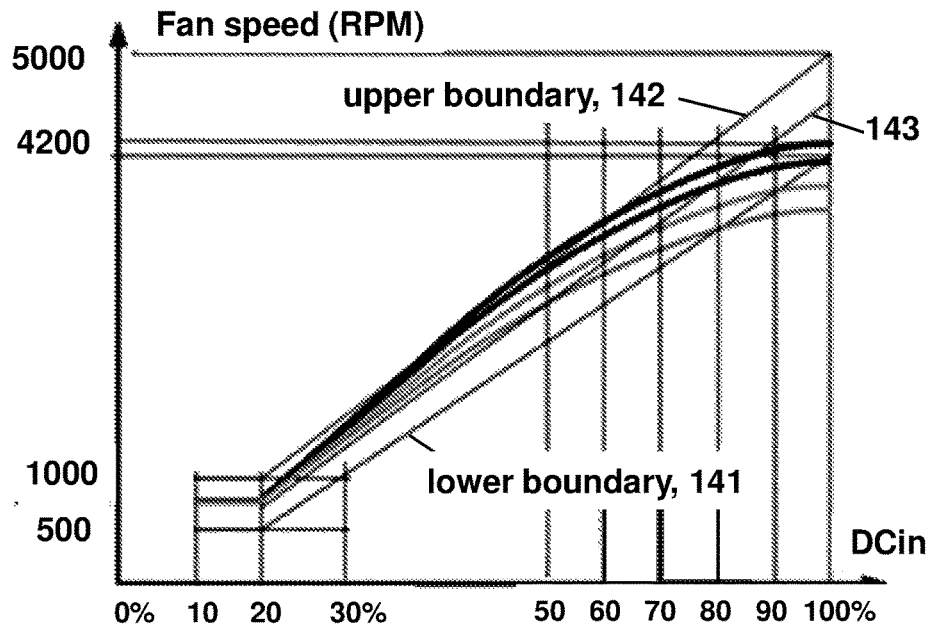
FIG. 14 shows a simulation of the behavior of the fan used in FIG. 4, when energized with one of the waveform patterns shown in FIG. 9 to FIG. 12. As can be seen, none of these curves falls between the boundary lines 141, 142.
Figure 15:
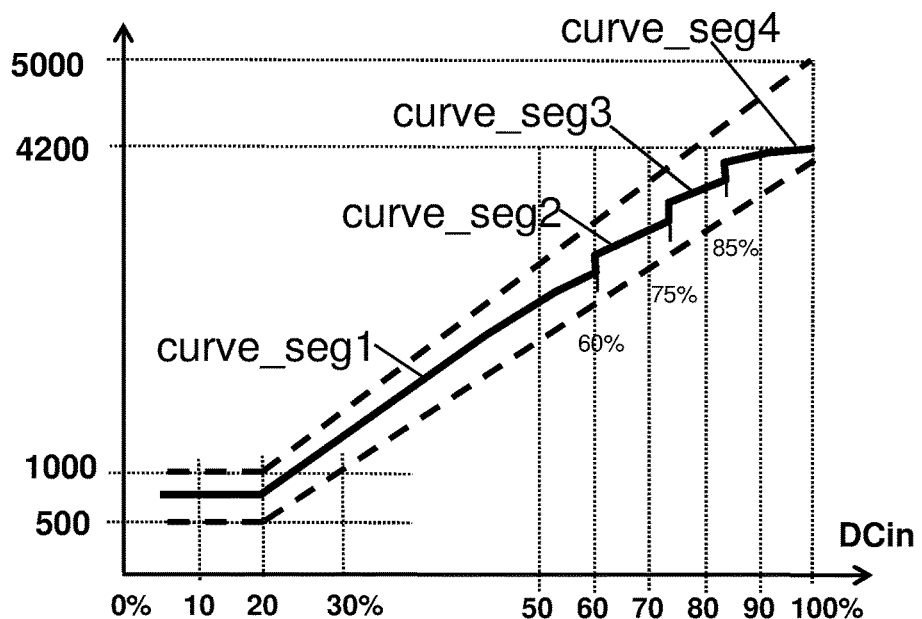
FIG. 15 illustrates an embodiment of the present invention, whereby the waveform pattern is not fixed, but is dynamically chosen as a function of the duty cycle input signal DCin. In the example shown, the transfer function of the single coil motor driver is composed of four curve-segments, and there is no hysteresis when jumping from one to the other segment.

FIG. 14 shows four different curves of the fan speed as a function of the duty cycle input "DCin", as would be obtained with four different waveforms corresponding to four different but fixed settings (the settings being independent of DCin), as is known in the art. As can be seen in FIG. 14, none of these waveforms fits entirely between the boundary-lines 141, 142, meaning that none of them satisfies the requirements described above in relation to FIG. 3 and FIG. 4, despite the fact that portions of these curves are located between the boundary lines FIG. 15 illustrates the effect of dynamically configuring at least one of the configurable settings Ssw, Soff and Sla, for example by dynamically adjusting any of the parameters selected from the group consisting of: "Ssw", "Ssw_rising", "Ssw_falling", "Soff", "Soff_before", "Soff_after" and "Sla", as discussed above. As can be seen, the curve of FIG. 15 effectively combines different portions of the curves shown in FIG. 14, which is the result of dynamically changing at least one setting of the waveform generator. In other words, a "combined curve" or multi-segment curve as shown in FIG. 15 is obtained, which does fit between the boundary lines if the segments are well chosen.

The motor driver 600, 700, 800 can be designed to provide only a single multi-segment curve (as shown for example in FIG. 15), but could also be adapted for generating multiple such multi-segment curves, whereby one of those multi-segment curves can be statically selected by means of external components, e.g. by external resistors and/or capacitors, or by means of an internal configuration memory. In such an embodiment, the features of "dynamic configuration of at least one configurable parameter Ssw, Soff and Sla" as a function of the duty cycle input signal, and a static selection of one of several multi-segment curves, are combined.

From the above, it is clear that embodiments of the present invention can be designed such that any desired noise/torque characteristic as a function of speed can be obtained. For example, the waveform patterns of FIG. 9 provide low noise at low fan speed, and offers high torque at high fan speed, which is a very desirable combination, yet seems to be an unrecognized possibility in cooling applications. At low motor speed, low commutation noise is important, because the noise generated by the blowing air is very low. At high motor speed, (which is needed when an object is very hot), good cooling is important, and the noise is typically dominated by the noise of the blowing air, hence the soft switching may be decreased, or even omitted.

In another example (not shown), the configuration unit 603, 703, 803 may be implemented to generate a multi-segment curve such that the resulting waveform patterns generate a somewhat higher noise (and thus a somewhat higher torque) than that of FIG. 9(f) at low fan speeds, for example by adding a seventh waveform to FIG. 9 (not shown) with the soft switching setting "Ssw" equal to 12.5% for DCin in the range of 0% to 40%, in addition to the six waveforms already shown in FIG. 9. Although this soft switch setting is rather low, thus creating more commutation noise, this would improve the start-up behavior.

In an embodiment with two multi-segment curves, the example described here above with seven waveforms may be implemented as a first multi-segment curve, and the embodiment of FIG. 9 with only six waveforms may be implemented as a second multi-segment curve. In that way, the customer can choose which of the two multi-segment curves he would like to use, for example by means of external components. But of course, the present invention is not limited to embodiments with only two multi-segment curves, and it is also possible to provide embodiments with more than two multi-segment curves. And of course, the multi-segment curves are not restricted to a seven-segment curve and an eight-segment curve discussed in relation to FIG. 9, but other variants are also possible.

It is pointed out that the solutions described in FIG. 6 to FIG. 8 are still an open loop system, since it does not use the actual motor speed in its decision to dynamically configure the at least one configurable setting, for example at least one soft switching setting Ssw, Ssw_rising, Ssw_falling, and/or at least one off-time Soff, Soff_before, Soff_after, and/or Sla, and it does not require complex circuitry such as a look-up table, or a calculation unit or the like. Hence, the single-coil motor driver described herein can be implemented in relatively simple circuitry, analog or digital or mixed analog and digital, which is an economically viable solution.

FIG. 10 illustrates another set of six different waveform patterns, as can be generated by a single-coil motor driver 600, 700, 800 according to embodiments of the present invention. These patterns have a configurable soft-switching "Ssw" and a configurable off-time "Soff", both expressed as a percentage of the phase time. In the examples shown in FIG. 10, the soft-switching rising time (that is the time for the curve to go from zero to a maximum positive or maximum negative value) is the same as the soft-switching falling time (that is the time for the curve to go from a maximum positive or from a maximum negative value to zero), although that is not absolutely necessary in all embodiments of the present invention. As can be seen, the waveforms of FIG. 10(d) to FIG. 10(f) are identical to those of FIG. 9(d) to FIG. 9(f), which means that for these curves Soff=0%, whereas the waveforms shown in FIG. 10(a) to FIG. 10(c) have an "Soff" of 6.25% (=1/16th of a phase, which can easily be implemented in a digital implementation by a "shift right operation" over four bits). The main advantage of providing a non-zero "off-time" as part of the waveform is that in this way the risk that the current is (albeit temporarily) flowing in the wrong direction (depending on the position of the rotor), which would cause commutation noise and active braking, can be drastically reduced. In the examples shown, the off-time is set at 6.25%, but other values could also be used, for example 1/32 of a phase time. In the examples shown, the off-time is set at 0% for the waveforms (d) to (f), because the effect of a small timing-mismatch is less dramatic at low speed, because the amplitude of the current is still relatively low around the switching point, but it is of course also possible to apply an off-time in these waveforms, if so desired.

In an alternative embodiment, an off-period of 6.25% could be omitted from the waveforms (b) and (c), and only be applied to the waveform (a) where no soft-switching is applied, and the current is abruptly changed.

Similar to what was said above in relation to FIG. 9, a single-coil motor driver according to embodiments of the present invention need not implement all six waveforms shown in FIG. 10, but may use for example only two of these waveforms, or only three of these waveforms, or only four of these waveforms. The individual waveforms (if applied over the entire DCin range) would result in speed curves similar to those of FIG. 14, but since different segments of each of these curves are used for different values of the duty cycle input signal DCin, a multi-segment curve similar to that of FIG. 15 would result with a number of "curve segments" equal to the number of different settings.

FIG. 11 shows another example of waveforms as may be generated by a configuration unit 603, 703, 803 of the present invention, for different ranges of the duty-cycle input signal DCin. A first waveform (a) corresponds to the combination of settings: Ssw_rise=1/8, Ssw_fall=1/8, Soff_before=0%, Soff_after=0%, Sla=0%, and could be used for relatively low motor speed, for example for DCin below 70%. The second waveform (b) corresponds to the combination of settings Ssw_rise=1/16, Ssw_fall=0%, Soff_before=3/32, Soff_after=1/32, Sla=1/16. This is shown in more detail in FIG. 12.

An embodiment using the two waveforms shown in FIG. 11 would have to implement only two sets of settings, depending on whether the input value is higher or lower than a particular threshold value (e.g. DCin larger or smaller than 70%), and the resulting speed-curve would be a multi-segment curve with one two segments, thus having only a single "step".

Figure 13:
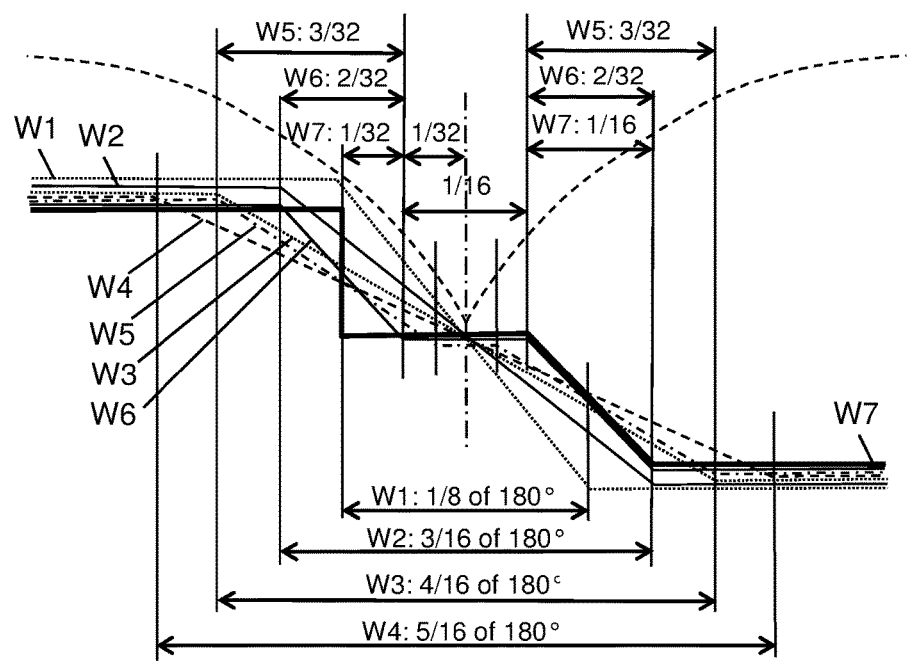
FIG. 13 shows a more advanced variant of FIG. 11 and FIG. 12, representing several different waveform patterns. (It is noted that the maximum and minimum value of the waveform patterns are deliberately drawn as separate lines, for illustrative purposes. This should not be interpreted that the maximum value of for example the first waveform pattern is higher than the maximum value of the fourth waveform pattern).

FIG. 13 shows a more sophisticated variant of the embodiment shown in FIG. 11 and FIG. 12. In this example, the configuration unit may generate for example seven different waveforms by using different sets of combinations of settings for Ssw_rise, Ssw_fall and Soff.

Similar waveforms as those shown in FIG. 13, but now in combination with various values of Sla, are shown in Table 1, as another example of a possible set of waveforms.

TABLE 1

| waveform | DCin range | Ssw_rise | Ssw_fall | Sla | Soff | Note |
|---|---|---|---|---|---|---|
| W1 | 0%-15% | 2/32 | 2/32 | 0% | 0% | note1 |
| W2 | 15%-20% | 4/32 | 4/32 | 0% | 0% | |
| W3 | 20%-65% | 5/32 | 5/32 | 0% | 1/32 | note2 |
| W4 | 65%-75% | 3/32 | 3/32 | 1/64 | 2/32 | |
| W5 | 75%-85% | 3/32 | 3/32 | 2/64 | 2/32 | |
| W6 | 90%-98% | 2/32 | 0% | 3/64 | 2/32 | |
| W7 | 90%-98% | 2/32 | 0% | 4/64 | 2/32 | |
| W8 | 98%-100% | 2/32 | 0% | 5/64 | 2/32 | note3 | note1:
Similar start up torque to standard state of the art single coil fandrivers
note2:
lowest commutation noise
note3:
highest torque It will be clear to the skilled person that the values and ranges shown in FIG. 13 and Table 1 are mere examples, and that other values or ranges may also be used. The main purpose of these example is to illustrate that it is well possible to generate multi-segment curves like the one shown in FIG. 15 with seven or more segments.

The example of Table 1 also illustrates that the soft-switching value(s) may be set to a first (set of) value(s) in a first (low) speed range (for good start-up behavior), to a second (set of) value(s) higher than the first (set of) value(s) in a second (e.g. middle) speed range (for low noise), and to a third (set of) value(s) lower than the second (set of) value(s) in a third (high) speed range (for high torque).

FIG. 14 and FIG. 15 were already discussed above.

Figure 16:
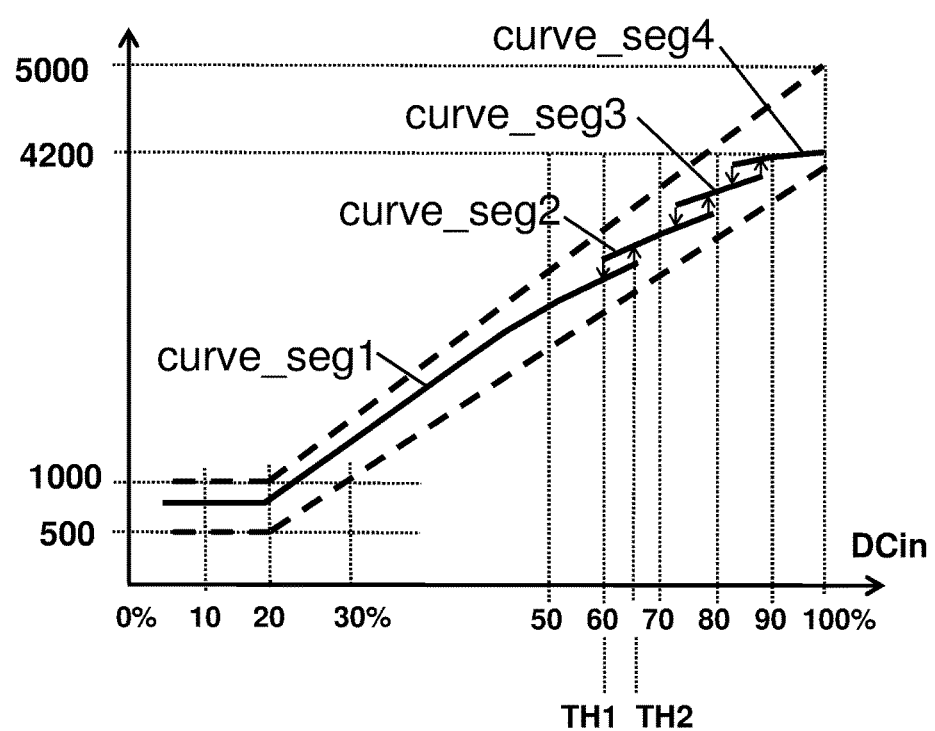
FIG. 16 illustrates a variant of the embodiment of FIG. 15, whereby the transfer function of the single coil motor driver is composed of four curve-segments, but there is hysteresis for reducing the risk of frequent jumping between the different curve segments.

FIG. 16 shows a variant of the speed curve of FIG. 15, whereby hysteresis is deliberately added. This can be implemented for example by using a configuration unit 603, 703, 803 with a state-machine, whereby a switch is made from curve1 to curve2 when the duty cycle input DCin is larger than a second threshold TH2 (e.g. >65%), but the switch from curve2 back to curve1 only occurs when the duty cycle input DCin is less than a first threshold TH1 (e.g. <60%). An advantage of adding hysteresis is that, if the duty cycle input DCin would for example fluctuate around the value of 60%+/−3%, in the embodiment of FIG. 15 that would result in frequent swapping between curve segment1 and curve segment2, which would mean frequent acceleration and deceleration of the motor with for example 100 RPM speed difference, which may be audible and annoying for the end-user. By adding some amount of hysteresis, such frequent swapping can be reduced or avoided.

Although not explicitly shown in a graph, it is also contemplated that at least one of the settings, e.g. the soft-switching setting "Ssw" is varied in a continuous manner, or in a relatively large number of steps, for example at least 16 steps, or at least 32 steps or at least 50 steps, (or in an analog manner) from a first value, for example from about 50% to a second value, for example to about 0%. In an embodiment of the single phase motor driver whereby the configuration unit 603, 703, 803 is implemented in a digital manner, this could for example be implemented by digital logic configured to set the "Ssw" parameter to 50% if the value of the duty-cycle input DCin is smaller than or equal to 50%, and to set the "Ssw" parameter to a value equal to (100% minus DCin) If the value of the duty-cycle input DCin is larger than 50%, but of course this is just a mere example, and other values and implementations can also be used. Such an embodiment would offer the advantage that no explicit hysteresis needs to be provided, and that the resulting speed curve is very smooth, with no noticeable discrete steps.

In a variant of this embodiment, not only the parameter "Ssw" is set with fine granularity, but also the parameter "Sla" and/or the parameter "Soff" are varied with fine granularity, e.g. in at least 32 steps, preferably in at least 64 steps. In this way, the multi-segment curve can be fine-tuned even more, for example such that the resulting speed curve would approach the linear "target" line 43 of FIG. 4 even better, hence, the risk that the resulting speed curve would fall outside of the boundary lines 41, 42 is even further reduced.

Figure 17:
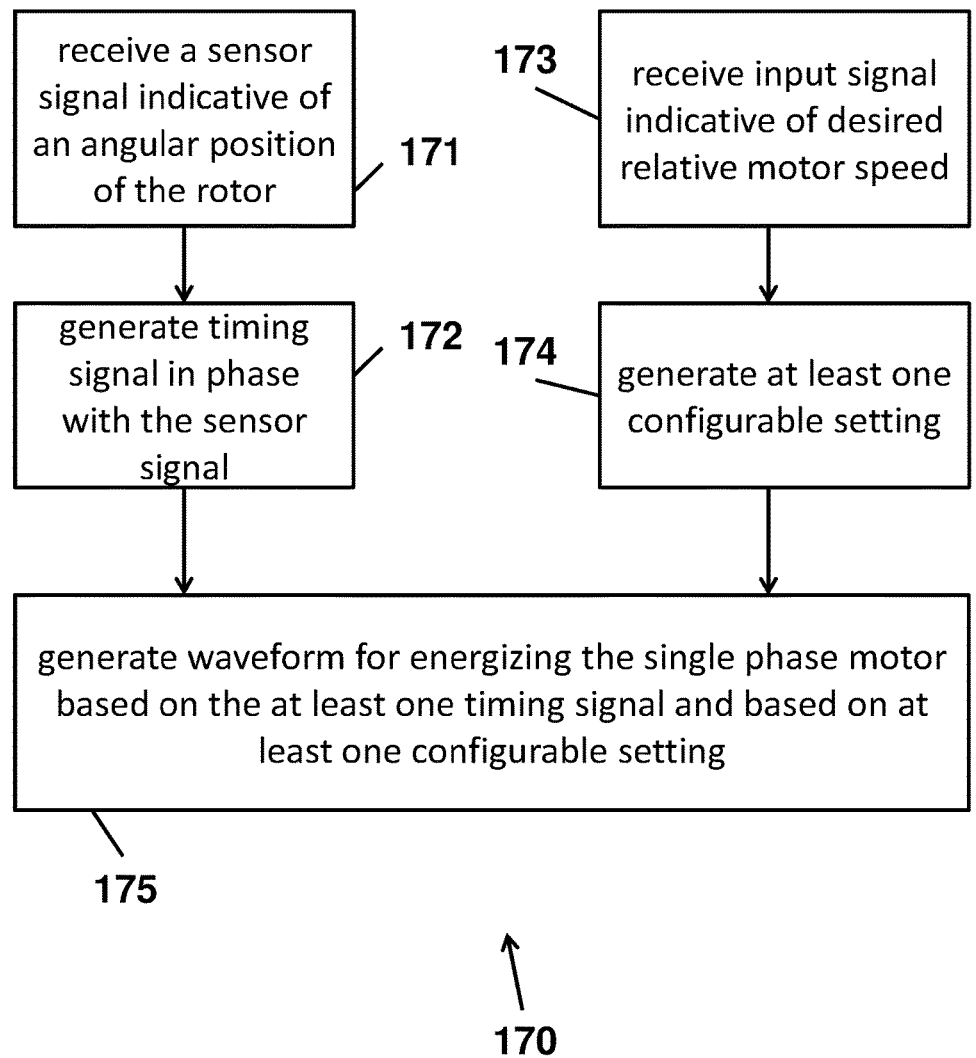
FIG. 17 illustrates a method of driving a single coil motor according to embodiments of the present invention.

FIG. 17 illustrates a method 170 of driving a single coil motor 690, 790, 890 according to embodiments of the present invention. In step 171, a sensor signal indicative of an angular position of a rotor of the single phase motor is received by the motor driver circuit. The sensor signal may for example be generated by an internal or external Hall element. In step 172 at least one timing signal is generated in phase with the sensor signal, which timing signal(s) are provided to a waveform generator 602, 702, 802. In step 173 an input signal 691, 791, 891 is received indicative of a desired speed of the single phase motor 690, 790, 890. The input signal may be a PWM-signal indicating the desired motor speed relative to a maximum motor speed. In step 174 at least one configurable setting (for example Ssw) is generated as a function of the input signal, and the at least one configurable setting is provided to the waveform generator 602, 702, 802. The at least one configurable setting may be for example a single soft switching setting Ssw (in case the rising edge and falling edge are symmetrical), or two soft switching Ssw_rise, Ssw_fall (in case the rising edge and falling edge are different), or an Off setting Soff, or two Off settings Soff_before, Soff_after, or a latency value Sla, or any combination hereof (as described above). In step 175 at least one waveform for energizing the single phase motor is generated, based on the at least one timing signal and based on at least one configurable setting, and typically also based on the polarity of the sensor signal.

Figure 18:
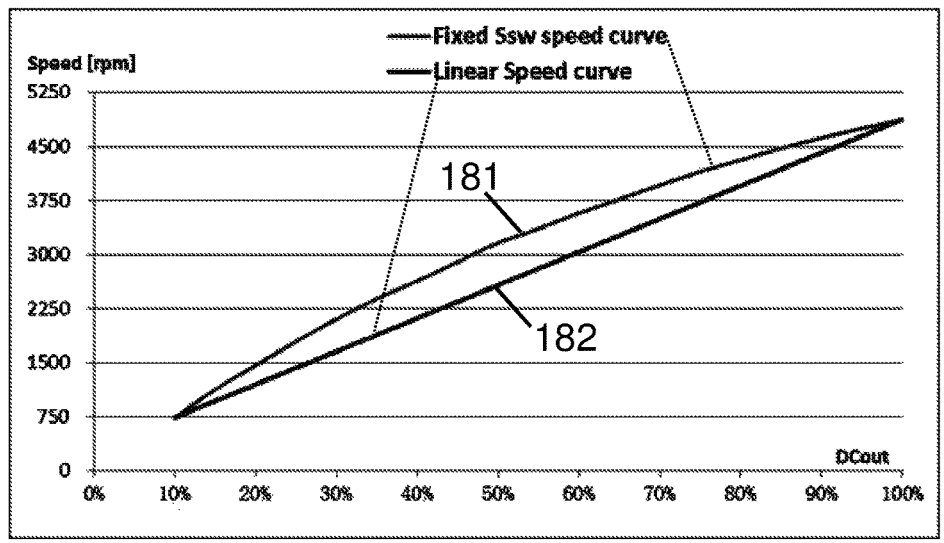
FIG. 18 shows a graph with two curves representing fan speed versus a so called "duty-cycle output signal". The linear curve represents the "target curve", the non-linear curve representing an actual fan speed curve obtained by a prior art motor driver having a fixed soft-switching setting.

FIG. 18 shows an exemplary graph of absolute fan speed versus a duty-cycle output signal DCout, as obtained by a prior art motor drive circuit having a duty convertor block and a waveform generator with a fixed soft switching setting of for example 12.5%. The linear curve represents the "target curve", the non-linear curve represents an actual fan speed. This graph is similar to the one shown in FIG. 4, but here the fan speed is shown as a function of DCout rather than DCin (whereby DCout is measured at the output of the duty cycle convertor block).

Figure 19:
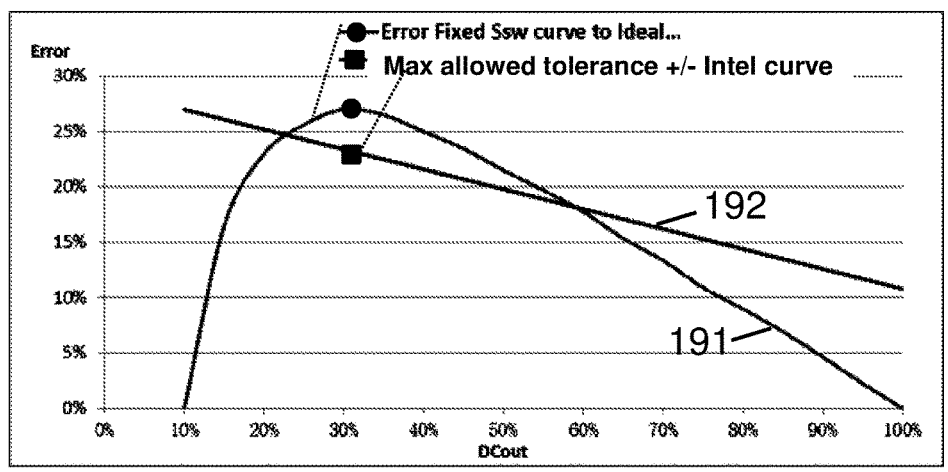
FIG. 19 shows an example of the maximum allowed deviation with respect to the target speed curve, expressed in terms of DCout, and an example of of an actual error obtained by a prior art motor driver having a fixed soft-switching setting.

FIG. 19 shows an example of the maximum allowed deviation 192 of the fan speed with respect to the target speed curve, plotted against DCout rather than DCin (otherwise the maximum allowed deviation would be 10%, as shown in FIG. 4). Curve 191 represents the actual deviation of the exemplary speed curve 181 of FIG. 18. It can be seen that the deviation of this fan speed curve is larger than the maximum allowed deviation. It can also be seen that the largest deviation is about 27%, which is relatively large. It is further noted that the deviation (in this example) is close to zero at DCout=10%, and at DCout=100%, and that the deviation curve has a single local maximum (at DCout=about 30%).

Figure 20:
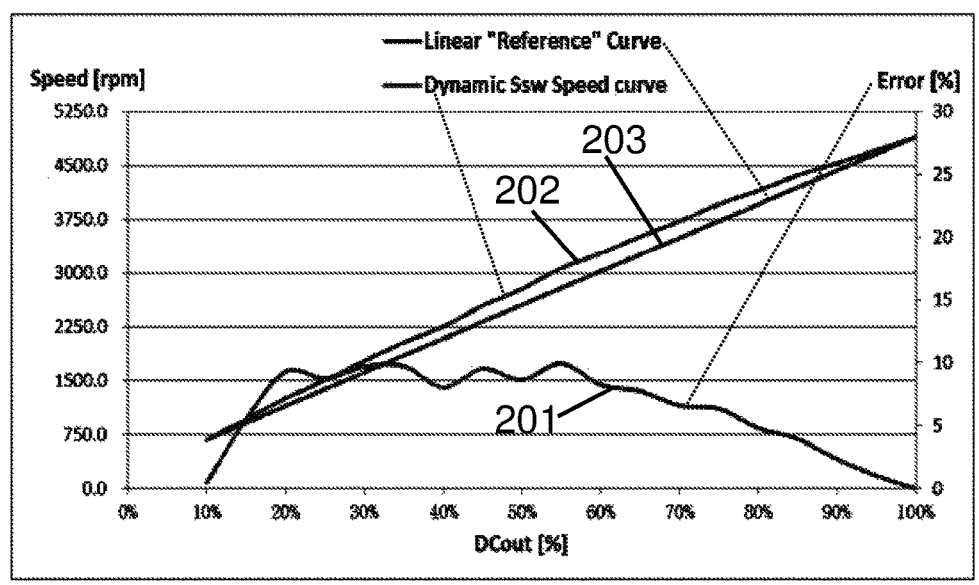
FIG. 20 is a combination of a graph similar to that of FIG. 18 (using the left vertical axis), and similar to that FIG. 19 (using the right vertical axis), but showing an example of a simulated speed curve obtainable by certain embodiments of the present invention wherein the soft switching setting is dynamically configured.

FIG. 20 is a combination of a graph similar to that of FIG. 18 (using the left vertical axis), and similar to that FIG. 19 (using the right vertical axis), but showing an exemplary fan speed curve obtainable by embodiments of the present invention wherein the soft switching setting is dynamically configured. As can be seen, the curve 202 better approaches the target curve 203, and the maximum deviation is about 10% (in contrast to 27% in the prior art). In this particular example, the deviation curve has four local maxima rather than only one.

Although some embodiments of the present invention have been described with external components (such as e.g. one or more resistors and/or capacitors), the skilled person will understand that thanks to the present invention, it will be easier to tune the speed curve, as one complicating factor has been removed in the fan design. Another benefit of the present invention is that audible noise can be reduced in a speed range of interest, whilst the start point P1 can be maintained, and the stop point P2 can also be maintained or even improved (higher torque). Another benefit of the present invention is that, thanks to the dynamic configuration of the settings, it may be possible to use a package with fewer pins, which can lead to inventory optimization which is another cost optimization. Although it is expected that a single "combined curve" can be found which is suitable for a large population of fans, it would still be possible, even with a six-pins package, to provide an embodiment of the single-coil motor driver that provides at least two different multi-segment curves, one of which can be selected by the end user, in a manner known in the art, e.g. by means.

Finally, as far as is known to the inventors, many of the prior art documents recognize that the commutation noise can be reduced by increasing the soft switching (time), but none of the documents seems to mention that advantage can be taken from the non-linearity of the speed curve in order to dynamically adapt the soft switching (time) in the relevant speed ranges, to reduce the acoustic noise levels in wide operating areas without affecting the max torque condition at max speed.

The invention claimed is:

1. A single phase motor drive circuit for driving a single phase motor, the single phase motor drive circuit comprising:
   a timer unit adapted for receiving a sensor signal indicative of an angular position of a rotor of the single phase motor, and for providing at least one timing signal in phase with the sensor signal;
   a waveform generator for generating at least one waveform for energizing the single phase motor, the waveform generator being adapted for receiving the at least one timing signal, and for receiving at least one configurable setting, and for generating the at least one waveform based on the at least one timing signal and based on the at least one configurable setting, the at least one configurable setting being selected from a soft switching setting, a lead angle setting, or an off time setting;
   a configuration unit adapted for receiving an input signal indicative of a desired speed of the single phase motor, and adapted for generating the at least one configurable setting as a function of the input signal, and for providing the at least one configurable setting to the waveform generator to dynamically configure the waveform generator as a function of the input signal,
   wherein the configuration unit is adapted for setting the at least one configurable setting to a first predefined value or first set of predefined values when a characteristic of the input signal is below a first predefined threshold value,
   wherein the configuration unit is adapted for setting the at least one configurable setting to a second predefined value or second set of predefined values when a characteristic of the input signal is above a second predefined threshold value,
   wherein the second threshold value is equal to or larger than the first threshold value, and
   wherein the input signal is a duty cycle input signal, and wherein the first threshold and the second threshold are values chosen in the range from 10% to 100%.

2. The single phase motor drive circuit according to claim 1, further comprising a duty cycle convertor unit adapted for receiving the duty cycle input signal and for converting the duty cycle input signal to a second duty cycle signal, and for applying the second duty cycle signal to the configuration unit.

3. The single phase motor driver circuit according to claim 1, wherein the sensor comprises a Hall element.

4. The single phase motor driver circuit according to claim 1, wherein the timer unit comprises at least one counter.

5. The single phase motor drive circuit according to claim 4, further comprising an oscillator for generating a clock signal to the timer unit.

6. The single phase motor drive circuit according to claim 1, further comprising a drive unit adapted to receive the at least one waveform from the waveform generator, and to provide at least one signal to drive the single phase motor.

7. The single phase motor drive circuit according to claim 1,
   wherein the first predefined value is a first counter value or the first set of predefined values is a first set of counter values, and
   wherein the second predefined value is a second counter value or the second set of predefined values is a second set of counter values, and
   wherein each of the predefined counter values are integer multiples of 1/N, whereby N is an integer power of 2.

8. The single phase motor drive circuit according to claim 1,
   wherein the at least one configurable setting is a soft switching setting for configuring both rising edges and falling edges of the waveform, or
   wherein the at least one configurable setting comprises a first soft switching setting for configuring rising edges of the waveform and a second soft switching setting for configuring falling edges of the waveform.

9. The single phase motor drive circuit according to claim 1,
   wherein the waveform generator is further adapted for receiving at least two configurable settings selected from a soft switching setting, a lead angle setting, or an off time setting, and
   wherein the configuration unit is further adapted for generating the at least two configurable settings as a function of the input signal, and for providing the at least two configurable settings to the waveform generator.

10. The single phase motor drive circuit according to claim 1, embedded in a packaging having at most eight pins.

11. The single phase motor drive circuit according to claim 1, further comprising a Hall sensor and the drive unit, and being embedded in a packaging having only six pins.

12. An assembly comprising:
    a single phase motor driver according to claim 1;
    a fan comprising a single-coil motor, whereby an output of the single phase motor driver is connected to an input of the motor for providing power;
    the assembly having a input for receiving an input signal indicative of the desired speed of the fan.

13. An assembly comprising a single phase motor drive circuit for driving a single phase motor and a fan, the single phase motor drive circuit comprising:
    a timer unit adapted for receiving a sensor signal indicative of an angular position of a rotor of the single phase motor, and for providing at least one timing signal in phase with the sensor signal;
    a waveform generator for generating at least one waveform for energizing the single phase motor, the waveform generator being adapted for receiving the at least one timing signal, and for receiving at least one configurable setting, and for generating the at least one waveform based on the at least one timing signal and based on the at least one configurable setting, the at least one configurable setting being selected from a soft switching setting, a lead angle setting, or an off time setting;
    a configuration unit adapted for receiving an input signal indicative of a desired speed of the single phase motor, and adapted for generating the at least one configurable setting as a function of the input signal, and for providing the at least one configurable setting to the waveform generator to dynamically configure the waveform generator as a function of the input signal;

the fan comprising a single-coil motor, whereby an output of the single phase motor driver is connected to an input of the motor for providing power;

the assembly having an input for receiving an input signal indicative of the desired speed of the fan;

wherein the input signal is a duty cycle input signal, and wherein the single phase motor driver is adapted such that a curve of the relative speed of said motor compared to its maximum speed, versus the duty cycle input signal falls between an upper boundary line and a lower boundary line located respectively 10% above and 10% below a predefined imaginary target line passing through a first predefined point located on the left and below a point with coordinates 50%, 50% in the relative speed versus duty cycle input graph, and a second predefined point located on the right and above the point with coordinates 50%, 50%.

14. A cooling system comprising:

an assembly comprising a single phase motor drive circuit for driving a single phase motor, a fan, and a processor, the single phase motor drive circuit comprising:

a timer unit adapted for receiving a sensor signal indicative of an angular position of a rotor of the single phase motor, and for providing at least one timing signal in phase with the sensor signal;

a waveform generator for generating at least one waveform for energizing the single phase motor, the waveform generator being adapted for receiving the at least one timing signal, and for receiving at least one configurable setting, and for generating the at least one waveform based on the at least one timing signal and based on the at least one configurable setting, the at least one configurable setting being selected from a soft switching setting, a lead angle setting, or an off time setting;

a configuration unit adapted for receiving an input signal indicative of a desired speed of the single phase motor, and adapted for generating the at least one configurable setting as a function of the input signal, and for providing the at least one configurable setting to the waveform generator to dynamically configure the waveform generator as a function of the input signal;

the fan comprising a single-coil motor, whereby an output of the single phase motor driver is connected to an input of the motor for providing power;

the processor having an output for providing a duty cycle signal as an input signal to the assembly;

the assembly having an input for receiving an input signal indicative of the desired speed of the fan;

wherein the input signal is a duty cycle input signal;

wherein the single phase motor driver is adapted such that a curve of the relative speed of said motor compared to its maximum speed, versus the duty cycle input signal falls between an upper boundary line and a lower boundary line located respectively 10% above and 10% below a predefined imaginary target line passing through a first predefined point located on the left and below a point with coordinates 50%, 50% in the relative speed versus duty cycle input graph, and a second predefined point located on the right and above the point with coordinates 50%, 50%.

15. A method of driving a single phase motor, comprising the steps of:

receiving a sensor signal indicative of an angular position of a rotor of the single phase motor;

generating at least one timing signal in phase with the sensor signal, and providing said at least one timing signal to a waveform generator;

receiving an input signal indicative of a desired speed of the single phase motor;

generating at least one configurable setting as a function of the input signal, and providing the at least one configurable setting to the waveform generator, the at least one configurable setting being selected from a soft switching setting, a lead angle setting, or an off time setting;

generating at least one waveform for energizing the single phase motor based on the at least one timing signal and based on at least one configurable setting, wherein the configuration unit is adapted for setting the at least one configurable setting to a first predefined value or first set of predefined values when a characteristic of the input signal is below a first predefined threshold value, wherein the configuration unit is adapted for setting the at least one configurable setting to a second predefined value or second set of predefined values when a characteristic of the input signal is above a second predefined threshold value, wherein the second threshold value is equal to or larger than the first threshold value, and wherein the input signal is a duty cycle input signal, and wherein the first threshold and the second threshold are values chosen in the range from 10% to 100%.

16. The method according to claim 15, wherein generating at least one configurable setting comprises:

setting the at least one configurable setting to a first predefined value or first set of predefined values when a characteristic of the input signal is below a first predefined threshold value, and setting the at least one configurable setting to a second predefined value or second set of predefined values when a characteristic of the input signal is above a second predefined threshold value, and whereby the second threshold value is equal to or larger than the first threshold value.

* * * * *

UNITED STATES PATENT AND TRADEMARK OFFICE
CERTIFICATE OF CORRECTION

| | |
|---|---|
| PATENT NO. | : 9,973,119 B2 |
| APPLICATION NO. | : 15/019032 |
| DATED | : May 15, 2018 |
| INVENTOR(S) | : Dirk Leman, Houwen Zhang and Xing Zuo |

It is certified that error appears in the above-identified patent and that said Letters Patent is hereby corrected as shown below:

Column 28
Line 26, change "based on at least one" to --based on the at least one--
Line 27, change "wherein the configuration unit" to --wherein a configuration unit--
Line 27, change "is adapted for setting" to --sets--
Line 32, change "is adapted for setting" to --sets--
Lines 42-43, change "generating at least one" to --generating the at least one--

Signed and Sealed this
Tenth Day of July, 2018

Andrei Iancu
*Director of the United States Patent and Trademark Office*